(12) United States Patent
Yasui

(10) Patent No.: US 11,001,242 B2
(45) Date of Patent: May 11, 2021

(54) BRAKING CONTROL DEVICE FOR VEHICLE

(71) Applicant: ADVICS CO., LTD., Kariya (JP)

(72) Inventor: Yoshiyuki Yasui, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 148 days.

(21) Appl. No.: 16/334,585

(22) PCT Filed: Apr. 18, 2017

(86) PCT No.: PCT/JP2017/015514
§ 371 (c)(1),
(2) Date: Mar. 19, 2019

(87) PCT Pub. No.: WO2018/055822
PCT Pub. Date: Mar. 29, 2018

(65) Prior Publication Data
US 2020/0172064 A1 Jun. 4, 2020

(30) Foreign Application Priority Data

Sep. 26, 2016 (JP) .............................. JP2016-186636

(51) Int. Cl.
*B60T 8/1761* (2006.01)
*B60T 8/171* (2006.01)
*B60T 13/74* (2006.01)

(52) U.S. Cl.
CPC ............ *B60T 8/1761* (2013.01); *B60T 8/171* (2013.01); *B60T 13/746* (2013.01)

(58) Field of Classification Search
CPC .... B60T 13/166; B60T 13/662; B60T 13/686; B60T 13/745; B60T 13/746; B60T 7/042; B60T 8/171; B60T 8/1761; B60T 8/17616
See application file for complete search history.

(56) References Cited

U.S. PATENT DOCUMENTS

| 6,199,963 B1 * | 3/2001 | Shimizu | B60T 7/12 303/116.2 |
|---|---|---|---|
| 6,234,589 B1 * | 5/2001 | Yoshida | B60T 7/042 303/113.4 |

(Continued)

FOREIGN PATENT DOCUMENTS

| JP | 2008184057 A | 8/2008 |
|---|---|---|
| JP | 2012131293 A | 7/2012 |

(Continued)

OTHER PUBLICATIONS

International Search Report (PCT/ISA/210) dated Aug. 1, 2017, by the Japanese Patent Office as the International Searching Authority for International Application No. PCT/JP2017/015514.

(Continued)

*Primary Examiner* — Babar Sarwar
(74) *Attorney, Agent, or Firm* — Buchanan, Ingersoll & Rooney PC

(57) ABSTRACT

A braking control device drives an electric motor based on a command pressing force corresponding to the required wheel braking force, and presses a friction member against a rotation member fixed to the wheel to generate a wheel braking force. The braking control device includes: a sensor for detecting wheel speed; a sensor for detecting the actual pressing force applied by the friction member; and a controller for calculating the target pressing force based on the command pressing force, and controlling the motor so that the target and actual pressing forces match. The controller calculates wheel slip state quantity based on the wheel speed, and executes, based on the slip state quantity, slip suppression control for reducing the degree of wheel slippage. Based on the actual pressing force at the start of the slip suppression control, the controller reduces the command pressing force and calculates the target pressing force.

1 Claim, 9 Drawing Sheets

(56) References Cited

U.S. PATENT DOCUMENTS

| | | | | |
|---|---|---|---|---|
| 8,046,146 B2* | 10/2011 | Osborn | ............... | B60T 8/17616 701/71 |
| 2002/0040268 A1* | 4/2002 | Yamada | ................... | B60T 8/171 701/74 |
| 2004/0068358 A1* | 4/2004 | Walenty | .............. | B60T 8/17616 701/71 |
| 2007/0225882 A1* | 9/2007 | Yamaguchi | ......... | B60W 30/095 701/36 |
| 2008/0179941 A1 | 7/2008 | Matsushita | | |
| 2009/0101428 A1* | 4/2009 | Itoh | .......................... | B60T 8/175 180/197 |
| 2010/0036577 A1* | 2/2010 | Kodama | .................... | B60T 1/10 701/76 |
| 2010/0324766 A1* | 12/2010 | Linda | .................. | B60W 40/076 701/22 |
| 2011/0148184 A1* | 6/2011 | Suzuki | .................... | B60L 3/108 303/3 |
| 2012/0109482 A1* | 5/2012 | Yoshii | ........................ | B60T 7/12 701/70 |
| 2012/0197506 A1* | 8/2012 | Reynolds | ............ | B60T 8/17616 701/84 |
| 2012/0203433 A1* | 8/2012 | Higa | ...................... | B60T 13/745 701/50 |
| 2013/0207451 A1* | 8/2013 | Ohkubo | ................ | B60T 8/5081 303/9.62 |
| 2013/0304314 A1* | 11/2013 | Udaka | ..................... | B60T 17/22 701/34.4 |
| 2014/0145498 A1* | 5/2014 | Yamakado | ............ | B60W 30/02 303/3 |
| 2014/0257664 A1* | 9/2014 | Arbitmann | ................ | B60L 7/26 701/71 |
| 2015/0158476 A1* | 6/2015 | Miyazaki | .............. | B60T 13/686 303/10 |
| 2016/0214486 A1* | 7/2016 | Suzuki | ..................... | B60L 15/20 |
| 2016/0355170 A1* | 12/2016 | Yasui | ..................... | B60T 13/746 |
| 2016/0356370 A1* | 12/2016 | Richards | ............. | B60W 10/184 |
| 2017/0057515 A1* | 3/2017 | Kelly | .................... | B60W 10/22 |
| 2017/0113700 A1* | 4/2017 | Kaneko | ........... | B60W 30/18181 |
| 2018/0201241 A1* | 7/2018 | Takae | .................... | B60T 8/4827 |

FOREIGN PATENT DOCUMENTS

| | | |
|---|---|---|
| JP | 2014051198 A | 3/2014 |
| JP | 5910424 B2 | 4/2016 |

OTHER PUBLICATIONS

Written Opinion (PCT/ISA/237) dated Aug. 1, 2017, by the Japanese Patent Office as the International Searching Authority for International Application No. PCT/JP2017/015514.

* cited by examiner

BRAKING CONTROL DEVICE FOR VEHICLE

TECHNICAL FIELD

The present invention relates to a braking control device for a vehicle.

BACKGROUND ART

Patent Document 1 discloses a brake device to improve responsiveness to the generation of a braking force without increasing the size of an electric motor for driving an electric braking-force generator. The brake device includes a target brake-fluid pressure calculator M1 that calculates target brake-fluid pressure to be generated in a slave cylinder, a differential unit M2 that calculates the change rate of the target brake-fluid pressure by differentiating the target brake-fluid pressure with respect to time, a field current calculator M3 that calculates the field current-command value of an electric motor driving a slave cylinder on the basis of the change rate of the target brake-fluid pressure, and an electric motor controller M4 that performs field weakening control of the electric motor on the basis of the field current-command value. A case where the change rate of the target brake-fluid pressure is large is an emergency where a braking force needs to be sharply increased; and the brake device increases the amount of a weak field of the electric motor by increasing the field current-command value at this time, increases the rotational speed of the electric motor to operate the slave cylinder at a high speed, and improves responsiveness to the generation of a braking force.

Patent Document 2 discloses a brake system to further improve responsiveness to a brake force generated by an electric actuator with a simple structure. The brake system controls the driving of a motor-driven cylinder 13, which applies brake fluid pressure to a wheel cylinder, by performing field weakening control in a case where a deviation Δθ between a target motor angle θt obtained according to the amount of a brake operation and an actual motor angle θm is large. In a case where, for example, a motor angle (rotation angle) is used as the amount of operation of the electric actuator, the motor angle can be detected with high accuracy by a publicly known simple and inexpensive rotation sensor or the like. Accordingly, the variation range of the motor angle is widened, so that braking responsiveness can be easily improved. Further, a deviation of the motor angle is generated in a transient state immediately after the start of field weakening control without being affected by a change in load stiffness, and field weakening control can continue to be executed. Accordingly, since a variation in the response characteristics of the motor is reduced, stable response characteristics is obtained.

An applicant is developing a braking control device for a vehicle that generates braking torque by an electric motor and suppresses an increase in wheel slip at the time of start of execution of slip-suppression control for a wheel. Specifically, the slip-suppression control for a wheel, which controls an electric motor on the basis of the slip state quantity of a wheel to reduce the braking torque of the wheel, is executed as disclosed in Patent Document 3. Further, suddenly stop control for suddenly stopping the rotational drive of the electric motor is executed on the basis of the slip state quantity of a wheel. Suddenly stop control is started under a condition where the slip-suppression control for a wheel is not executed. "Control for stepwise changing the amount of current, which flows in an electric motor, to a preset limit current amount corresponding to a direction where the electric motor is decelerated" can be executed as the suddenly stop control.

Patent Documents 1 and 2 disclose devices that improve responsiveness to a braking force by field weakening control (also referred to as control for weakening magnetic fluxes) performed by allowing a negative current to flow along a d axis of the electric motor. However, a time delay for a braking force is still present. For this reason, there may be a case where excessive wheel slip occurs due to the time delay at the time of execution of control for suppressing wheel slip.

This will be described with reference to a time series diagram of FIG. 9. Actual values Fpa of a pressing force are plotted in FIG. 9 so as to correspond to command values Fps of the pressing force. First, a case where antilock brake control (one of wheel slip-suppression control) is not executed is supposed. Sudden braking is started at a time u0. The command pressing force Fps is calculated on the basis of the operation amount Bpa of a braking operation member BP, and is suddenly increased to a value fp0 from "0" as illustrated by one-dot chain line. An actual pressing force (actual pressing force) Fpa is increased on the basis of a deviation eFp between a command pressing force Fps and an actual pressing force Fpa by pressing force-feedback control so that a deviation eFp approaches "0". At this time, a time delay is present in an increase in the actual pressing force Fpa with respect to an increase in the command pressing force Fps. For this reason, the actual pressing force Fpa is increased as illustrated by a solid line.

Next, a case where the actual pressing force Fpa reaches a value fp1 at a time u1, wheel slip is excessive, and antilock brake control is stated is supposed as a condition where a sudden operation is performed. The command pressing force Fps at the time u1 has a command value fp0 and is larger than an actual value fp1. The command pressing force Fps is reduced sharply on the basis of the execution of antilock brake control, but the command pressing force Fps is larger than the actual pressing force Fpa until a time u2. For this reason, the actual pressing force Fpa is controlled by pressing force-feedback control so as match the command pressing force Fps. As a result, the actual pressing force Fpa is increased up to a value fp2 without being reduced. Since the command pressing force Fps becomes smaller than the actual pressing force Fpa after the time u2, the actual pressing force Fpa is reduced from the value fp2 but a timing when the actual pressing force Fpa starts is delayed. Wheel slip may be excessively increased due to this time delay. Accordingly, it is desired that excessive wheel slip caused by the time delay of an increase in a pressing force is suppressed.

CITATION LIST

Patent Document

Patent Document 1: JP-A-2008-184057
Patent Document 2: JP-A-2012-131293
Patent Document 3: JP-A-2014-051198

SUMMARY OF THE INVENTION

Technical Problem

An object of the invention is to provide a braking control device that can more effectively suppress excessive wheel slip at the time of start of control for suppressing wheel slip.

Solution to Problem

A braking control device for a vehicle according to the invention drives an electric motor (MTR) on the basis of a command pressing force (Fps) corresponding to a braking force required for a wheel (WH) of a vehicle and presses a friction member (MS) against a rotation member (KT) fixed to the wheel (WH) to generate a braking force on the wheel (WH). The braking control device for a vehicle includes a wheel speed sensor (VWA) that detects a speed (Vwa) of the wheel (WH); a pressing force sensor (FPA) that detects an actual pressing force (Fpa) applied to the rotation member (KT) by the friction member (MS); and a controller (ECU) that calculates a target pressing force (Fpt) on the basis of the command pressing force (Fps) and controls the electric motor (MTR) so that the target pressing force (Fpt) and the actual pressing force (Fpa) match each other.

In the braking control device for a vehicle according to the invention, the controller (ECU) calculates a slip state quantity (Slp) representing the degree of slippage of the wheel on the basis of the speed (Vwa) of the wheel (WH) and executes slip-suppression control, which reduces the degree of slippage of the wheel (WH), on the basis of the slip state quantity (Slp), and reduces the command pressing force (Fps) and calculates the target pressing force (Fpt) on the basis of the actual pressing force (Fpa=fp2) at the start (t2) of execution of the slip-suppression control. Further, the controller (ECU) sharply reduces the command pressing force (Fps) to a value (fp2) of the actual pressing force (Fpa), which is obtained at the time (t2) of start of execution of the slip-suppression control, to calculate the target pressing force (Fpt) at the time (t2) of start of execution of the slip-suppression control.

According to the configuration, the command pressing force Fps is reduced and corrected on the basis of the actual pressing force (detected value)Fpa(=fp2) at the time of start of execution of slip-suppression control, so that the final target pressing force Fpt is calculated. For this reason, there is no deviation eFp between the target pressing force Fpt and the actual pressing force Fpa at the time (time t2) of start of execution of slip-suppression control. As a result, the hindrance of a reduction in the actual pressing force Fpa, which is caused by pressing force-feedback control, is avoided. That is, excessive wheel slip, which is caused by a time delay in an increase of a pressing force at the time of start of execution of slip-suppression control, is suppressed.

MODE FOR CARRYING OUT THE INVENTION

<Overall Configuration of Braking Control Device for Vehicle According to the Invention>

Figure 1:
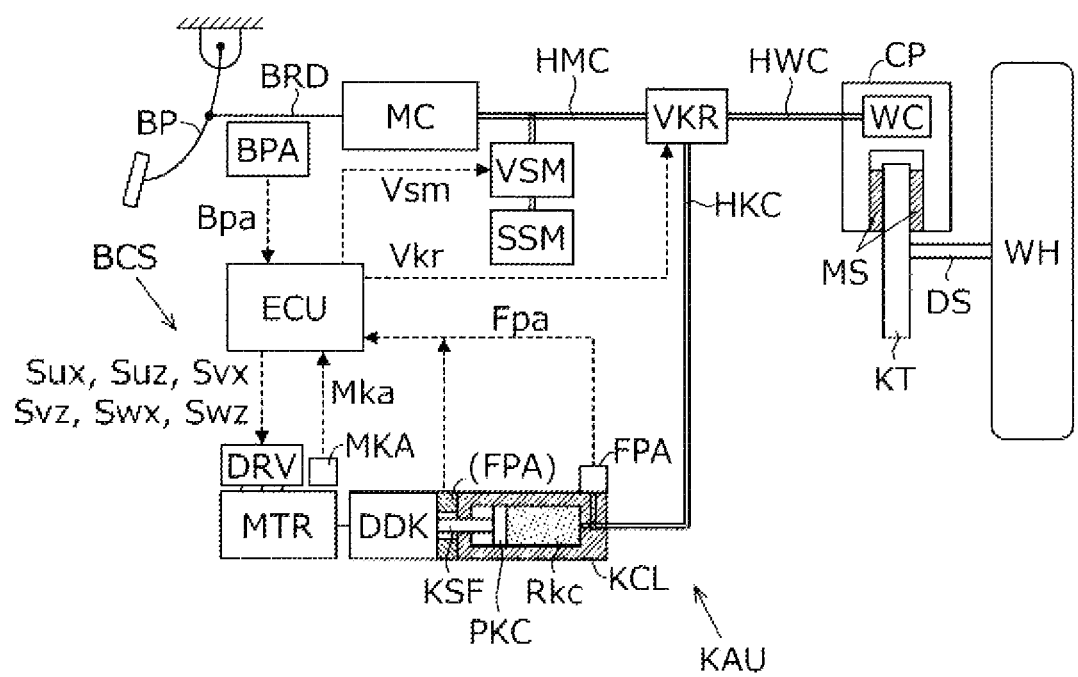
FIG. 1 is a diagram illustrating the overall configuration of a vehicle on which a braking control device BCS for a vehicle according to the invention is mounted.

A braking control device BCS according to the invention will be described with reference to a diagram of FIG. 1 that illustrates the overall configuration of a vehicle. In the following description, components, calculation processing, signals, characteristics, and values denoted by the same reference numerals will fulfill the same functions. Accordingly, repeated description will be omitted.

A vehicle including the braking control device BCS is provided with a braking operation member BP, a braking-operation-amount sensor BPA, a controller ECU, a master cylinder MC, a stroke simulator SSM, a simulator shut-off valve VSM, a pressurizing unit KAU, a switching valve VKR, a master cylinder pipe HMC, a wheel cylinder pipe HWC, and a pressurizing cylinder pipe HKC. In addition, each wheel WH of the vehicle is provided with a brake caliper CP, a wheel cylinder WC, a rotation member KT, and a friction member MS.

The braking operation member (for example, a brake pedal) BP is a member that is operated by a driver to reduce the speed of the vehicle. The braking operation member BP is operated, so that braking torque applied to the wheel WH is adjusted and a braking force is generated on the wheel WH. Specifically, the rotation member (for example, a brake disc) KT is fixed to the wheel WH of the vehicle. The brake caliper CP is disposed so as to hold the rotation member KT. Further, the brake caliper (also simply referred to as a caliper) CP is provided with the wheel cylinder WC. Fluid pressure in the wheel cylinder WC of the caliper CP is adjusted (increased or reduced), so that a piston provided in the wheel cylinder WC is moved (moved forward or moved rearward) relative to the rotation member KT. The friction member (for example, a brake pad) MS is pushed against the rotation member KT due to the movement of the piston, so that a pressing force is generated. The rotation member KT and the wheel WH are fixed to each other by a fixing shaft DS so as to be rotated integrally with each other. For this reason, braking torque (braking force) is generated on the wheel WH by a friction force that is caused by the pressing force. Accordingly, a braking force (required braking force) required for the wheel WH is achieved according to a target value of the pressing force.

The braking operation member BP is provided with the braking-operation-amount sensor (also simply referred to as an operation-amount sensor) BPA. The operation amount Bpa of the braking operation member (brake pedal) BP, which is operated by a driver, is detected by the operation-amount sensor BPA. Specifically, at least one of a fluid pressure sensor that detects the pressure of the master cylinder MC, an operating displacement sensor that detects the operating displacement of the braking operation member BP, and an operating force sensor that detects the operating force of the braking operation member BP is employed as the braking-operation-amount sensor BPA. In other words, the operation-amount sensor BPA is the generic name of the fluid pressure sensor of the master cylinder, the operating displacement sensor, and the operating force sensor. Accordingly, the braking operation amount Bpa is determined on the basis of at least one of the fluid pressure of the master cylinder MC, the operating displacement of the braking operation member BP, and the operating force of the braking operation member BP. The operation amount Bpa is input to the controller ECU.

The controller (electronic control unit) ECU includes an electric circuit board on which a microprocessor and the like are mounted, and a control algorithm that is programmed in the microprocessor. The controller ECU controls the pressurizing unit KAU (particularly, an electric motor MTR), the shut-off valve VSM, and the switching valve VKR on the basis of the braking operation amount Bpa. Specifically, signals (Sux and the like), which are required to control the electric motor MTR, the shut-off valve VSM, and the switching valve VKR, are calculated on the basis of the programmed control algorithm, and are output from the controller ECU.

In a case where the braking operation amount Bpa becomes equal to or larger than a predetermined value bp0, the controller ECU outputs a drive signal Vsm that allows the shut-off valve VSM to be switched to an open position, to the solenoid valve VSM and outputs a drive signal Vkr, which allows the switching valve VKR to make the pressurizing cylinder pipe HKC and the wheel cylinder pipe HWC be in a communication state, to the solenoid valve VKR. In this case, the master cylinder MC communicates with the simulator SSM and a pressurizing cylinder KCL communicates with the wheel cylinder WC.

The controller ECU calculates drive signals (Sux and the like), which are required to drive the electric motor MTR, on the basis of the operation amount Bpa, a rotation angle Mka, and an actual pressing force Fpa (for example, the fluid pressure of the pressurizing cylinder KCL), and outputs the drive signal to a drive circuit DRV. Here, the braking operation amount Bpa is detected by the braking-operation-amount sensor BPA, an actual rotation angle Mka is detected by a rotation angle sensor MKA, and the actual pressing force Fpa is detected by a pressing force sensor FPA. The pressure of braking fluid, which is present in the wheel cylinder WC, is controlled (maintained, increased, or reduced) by the pressurizing unit KAU that is driven by the electric motor MTR.

The master cylinder MC is mechanically connected to the braking operation member BP through a brake rod BRD. The operating force (brake pedal force) of the braking operation member BP is converted into the pressure of braking fluid by the master cylinder MC. The master cylinder pipe HMC is connected to the master cylinder MC, and braking fluid is discharged (pumped) to the master cylinder pipe HMC from the master cylinder MC in a case where the braking operation member BP is operated. The master cylinder pipe HMC is a fluid passage that connects the master cylinder MC to the switching valve VKR.

The stroke simulator (also simply referred to as a simulator) SSM is provided to generate an operating force on the braking operation member BP. The simulator shut-off valve (also simply referred to as a shut-off valve) VSM is provided between a fluid pressure chamber, which is provided in the master cylinder MC, and the simulator SSM. The shut-off valve VSM is a two-position solenoid valve that includes an open position and a closed position. In a case where the shut-off valve VSM is switched to the open position, the master cylinder MC and the simulator SSM are in a communication state. In a case where the shut-off valve VSM is present at the closed position, the master cylinder MC and the simulator SSM are in a shut-off state (non-communication state). The shut-off valve VSM is controlled according to the drive signal Vsm output from the controller ECU. A normally closed solenoid valve (NC valve) can be employed as the shut-off valve VSM.

A piston and an elastic body (for example, a compression spring) are provided in the simulator SSM. Braking fluid is moved to the simulator SSM from the master cylinder MC, so that the piston is pushed by the braking fluid flowing in. A force is applied to the piston in a direction where the inflow of braking fluid is hindered by the elastic body. An operating force (for example, a brake pedal force) in a case where the braking operation member BP is operated is formed by the elastic body.

<<Pressurizing Unit KAU>>

The pressurizing unit KAU uses the electric motor MTR as a power source and discharges (pumps) braking fluid to the pressurizing cylinder pipe HKC. Then, the pressurizing unit KAU pushes (presses) the friction member MS against the rotation member KT by this pressure to apply braking torque (braking force) to the wheel WH. In other words, the pressurizing unit KAU generates a force (pressing force), which pushes the friction member MS against the rotation member KT, by the electric motor MTR. The pressurizing unit KAU includes the electric motor MTR, the drive circuit DRV, a power transmission mechanism DDK, a pressurizing shaft KSF, the pressurizing cylinder KCL, a pressurizing piston PKC, and the pressing force sensor FPA.

The electric motor MTR is a power source that allows the pressurizing cylinder KCL to adjust (increase, reduce, or the like) the pressure of braking fluid present in the wheel cylinder WC. A three-phase brushless motor is employed as the electric motor MTR. The electric motor MTR includes three coils CLU, CLV, and CLW corresponding to a U phase, a V phase, and a W phase, and is driven by the drive circuit DRV. The electric motor MTR is provided with a rotation angle sensor MKA that detects the rotor position (rotation angle) Mka of the electric motor MTR. The rotation angle Mka is input to the controller ECU.

The drive circuit DRV is an electric circuit board on which a switching element (power semiconductor device) for driving the electric motor MTR, and the like are mounted. Specifically, a three-phase bridge circuit is formed in the drive circuit DRV and a state where currents flow to the electric motor MTR is controlled on the basis of drive signals (Sux and the like). The drive circuit DRV is provided with current sensors (for example, current sensors) IMA that detect actual currents Ima (the generic name of actual currents of the respective phases) flowing in the electric motor MTR. The currents (detected values) Ima of the respective phases are input to the controller ECU.

The power transmission mechanism DDK reduces the speed of the rotational power of the electric motor MTR, converts the rotational power into linear power, and outputs the linear power to the pressurizing shaft KSF. Specifically, since the power transmission mechanism DDK is provided with a speed reducer (not illustrated), the speed of the rotational power generated from the electric motor MTR is reduced and is output to a screw member (not illustrated). Then, the rotational power is converted into the linear power of the pressurizing shaft KSF by the screw member. That is, the power transmission mechanism DDK is a rotation/linear motion conversion mechanism.

The pressurizing piston PKC is fixed to the pressurizing shaft KSF. The pressurizing piston PKC is inserted into the inner hole of the pressurizing cylinder KCL, so that a combination of the piston and the cylinder is formed. Specifically, a sealing member (not illustrated) is provided on the outer periphery of the pressurizing piston PKC, so that fluid-tightness is ensured between the pressurizing piston PKC and the inner hole (inner wall) of the pressurizing cylinder KCL. That is, a pressurizing chamber Rkc, which is partitioned by the pressurizing cylinder KCL and the pressurizing piston PKC and is filled with braking fluid, is formed.

The pressurizing piston PKC is moved in the direction of a central axis in the pressurizing cylinder KCL, so that the volume of the pressurizing chamber Rkc is changed. Since the volume is changed, braking fluid is moved between the pressurizing cylinder KCL and the wheel cylinder WC through the braking pipes (fluid passages) HKC and HWC. The braking fluid is sucked into or discharged from the pressurizing cylinder KCL, so that fluid pressure in the wheel cylinder WC is adjusted. As a result, a force for pressing the friction member MS against the rotation member KT is adjusted.

For example, a fluid pressure sensor, which detects the fluid pressure Fpa of the pressurizing chamber Rkc, is built in the pressurizing unit KAU (particularly, the pressurizing cylinder KCL) as the pressing force sensor FPA. The fluid pressure sensor (that is, the pressing force sensor) FPA is fixed to the pressurizing cylinder KCL, and the fluid pressure sensor FPA and the pressurizing cylinder KCL are integrated as the pressurizing unit KAU. A detected value Fpa of a pressing force (that is, the fluid pressure of the pressurizing chamber Rkc) is input to the controller ECU. The pressurizing unit KAU has been described above.

"A state where the wheel cylinder WC is connected to the master cylinder MC" and "a state where the wheel cylinder WC is connected to the pressurizing cylinder KCL" are switched by the switching valve VKR. The switching valve VKR is controlled on the basis of the drive signal Vkr that is output from the controller ECU. Specifically, in a case where a braking operation is not performed (in a case where "Bpa<bp0" is satisfied), the wheel cylinder pipe HWC communicates with the master cylinder pipe HMC through the switching valve VKR and does not communicate with (is shut off from) the pressurizing cylinder pipe HKC. Here, the wheel cylinder pipe HWC is a fluid passage that is connected to the wheel cylinder WC. In a case where a braking operation is performed (that is, in a case where "Bpa≥bp0" is satisfied), the switching valve VKR is excited on the basis of the drive signal Vkr, communication between the wheel cylinder pipe HWC and the master cylinder pipe HMC is blocked, and the wheel cylinder pipe HWC and the pressurizing cylinder pipe HKC are in a communication state.

<Processing Performed in Controller ECU>

Figure 2:
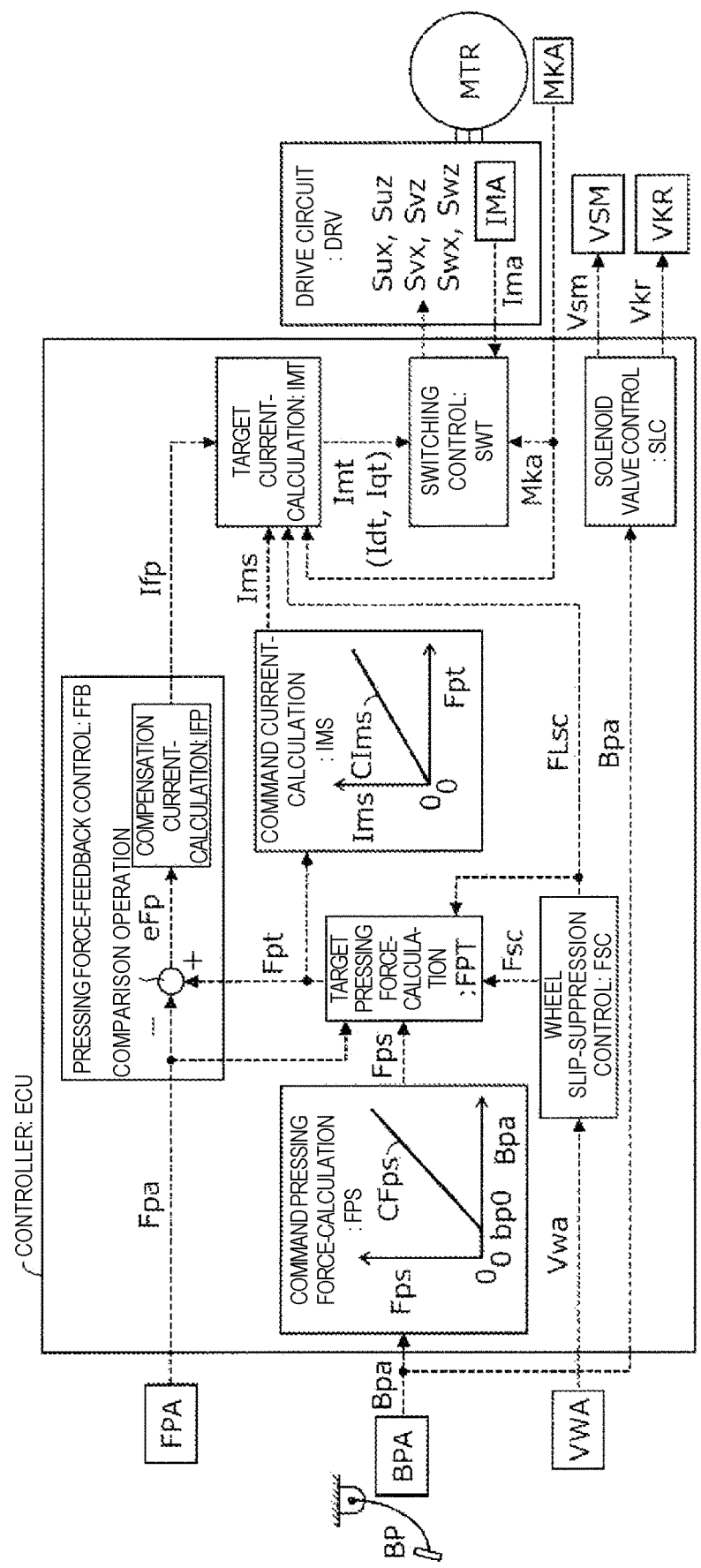
FIG. 2 is a functional block diagram illustrating processing performed in a controller ECU.

Processing performed in the controller (electronic control unit) ECU will be described with reference to a functional block diagram of FIG. 2. As described above, components, calculation processing, signals, characteristics, and values denoted by the same reference numerals will fulfill the same functions.

In the controller ECU, the driving of the electric motor MTR and the excitation of the solenoid valves VSM and VKR are performed on the basis of the operation amount Bpa of the braking operation member BP. The electric motor MTR is driven by the drive circuit DRV. The drive circuit DRV (three-phase bridge circuit) includes switching elements SUX, SUZ, SVX, SVZ, SWX, and SWZ (also simply written as "SUX to SWZ"). Drive signals Sux, Suz, Svx, Svz, Swx, and Swz (also simply written as "Sux to Swz) are calculated by the controller ECU, and the switching elements SUX to SWZ are controlled on the basis of the drive signals by the controller ECU. Further, the drive signals Vsm and Vkr are determined by the controller ECU, and the solenoid valves VSM and VKR are controlled on the basis of the drive signals by the controller ECU.

The controller ECU includes a command pressing force-calculation block FPS, a wheel slip-suppression control block FSC, a target pressing force-calculation block FPT, a command current-calculation block IMS, a pressing force-feedback control block FFB, a target current-calculation block IMT, a switching control block SWT, and a solenoid valve control block SLC.

In the command pressing force-calculation block FPS, a command pressing force Fps is calculated on the basis of the braking operation amount Bpa and calculation characteristics (calculation map) CFps. Here, the command pressing force Fps is a target value of fluid pressure (corresponding to a pressing force) that is generated by the pressurizing unit KAU. Specifically, according to the calculation characteristics CFps, the command pressing force Fps is calculated as "0 (zero)" in a range where the braking operation amount Bpa is equal to or larger than "0 (corresponding to a case where a braking operation is not performed)" and smaller than a predetermined value bp0, and the command pressing force Fps is calculated so as to monotonically increase from "0" with an increase in the operation amount Bpa in a range where the operation amount Bpa is equal to or larger than the predetermined value bp0. Here, the predetermined value bp0 is a value corresponding to the "backlash" of the braking operation member BP, and is referred to as a "backlash value".

In the wheel slip-suppression control block FSC, an adjustment pressing force Fsc is calculated on the basis of the wheel speed Vwa of each wheel WH. The adjustment pressing force Fsc is a target value that is required to execute wheel slip-suppression control. Here, the "wheel slip-suppression control" is to control independently and individually the slip states of four wheels WH of a vehicle to improve the stability of the vehicle. For example, the wheel slip-suppression control is at least one of antilock brake control and electronic brake force-distribution control. The adjustment pressing force Fsc, which is required to execute at least one of antilock brake control and electronic brake force-distribution control, is calculated in the wheel slip-suppression control block FSC.

The adjustment pressing force Fsc for antilock brake control is calculated in the wheel slip-suppression control block FSC. Specifically, the adjustment pressing force Fsc, which is required to execute antilock brake control so as to prevent wheel lock, is calculated on the basis of a result (wheel speed Vwa) acquired by a wheel speed sensor VWA that is provided on each wheel WH. For example, a wheel slip state quantity Slp (a control variable representing the state of the deceleration slip of the wheel) is calculated on the basis of the wheel speed Vwa. Then, the adjustment pressing force Fsc is determined on the basis of the wheel slip state quantity Slp.

Here, the wheel slip state quantity Slp is a state quantity (variable) that represents the degree of slippage of the wheel WH. For example, the wheel slip state quantity Slp is calculated on the basis of at least one of a wheel slip speed and a wheel deceleration. Here, the wheel slip speed is calculated on the basis of a difference between "a vehicle body speed Vxa calculated on the basis of the wheel speed Vwa of each wheel WH of the vehicle" and the wheel speed Vwa. Further, the wheel speed Vwa is differentiated with respect to time, so that the wheel deceleration is calculated. Then, at the time when the wheel slip state quantity Slp exceeds a predetermined quantity slx, antilock brake control is started and the adjustment pressing force Fsc is calculated so that the command pressing force Fps is reduced. Here, the predetermined quantity slx is a preset value (constant) that is required to determine whether or not to execute antilock brake control.

Likewise, in the wheel slip-suppression control block FSC, the adjustment pressing force Fsc is calculated to execute electronic brake force-distribution control, which suppresses the wheel slip of a rear wheel, on the basis of the result (wheel speed Vwa) acquired by each wheel speed sensor VWA. Specifically, an adjustment pressing force Fsc for the rear wheel is determined on the basis of the slip state quantity Slp of the rear wheel with respect to the slip state quantity Slp of the front wheel. Specifically, at the time when a difference between a front wheel slip speed and a rear wheel slip speed exceeds a predetermined speed slz, electronic brake force-distribution control is started and the adjustment pressing force Fsc is calculated so that the command pressing force Fps is maintained constant. Here, the predetermined speed slz is a preset value (constant) that is required to determine whether or not to execute electronic brake force-distribution control.

In the target pressing force-calculation block FPT, a target pressing force Fpt is calculated on the basis of the command pressing force Fps and the adjustment pressing force Fsc. Here, the target pressing force Fpt is a final target value of a pressing force, and corresponds to a braking force required for the wheel WH. In a case where wheel slip-suppression control is not executed, the command pressing force Fps is determined as the target pressing force Fpt just as it is. In a case where wheel slip-suppression control is executed, the command pressing force Fps is adjusted by the adjustment pressing force Fsc and a final target pressing force Fpt is calculated. For example, in a case where antilock brake control is executed by the wheel slip-suppression control block FSC, the command pressing force Fps is adjusted to be reduced by the adjustment pressing force Fsc so that wheel lock is avoided. Further, in a case where electronic brake force-distribution control is executed by the wheel slip-suppression control block FSC, the command pressing force Fps is adjusted to be kept by the adjustment pressing force Fsc so that an increase in rear wheel slip is suppressed. Detailed processing performed in the wheel slip-suppression control block FSC and the target pressing force-calculation block FPT will be described later.

In the command current-calculation block IMS, a command current Ims of the electric motor MTR is calculated on the basis of the target pressing force Fpt and preset calculation characteristics (calculation map) Clms. Here, the command current Ims is a target value of a current that is required to control the electric motor MTR. The command current Ims is determined in the calculation characteristics Clms so that the command current Ims is monotonically increased from "0" as the target pressing force Fpt is increased from "0".

In the pressing force-feedback control block FFB, a target value (for example, target fluid pressure) Fpt of a pressing force and an actual value (a detected value of fluid pressure) Fpa of a pressing force are used as state variables of control and a compensation current Ifp of the electric motor MTR is calculated on the basis of these values. Since an error occurs in a pressing force in a case where only in the control based on the command current Ims is executed, this error is compensated in the pressing force-feedback control block FFB. The pressing force-feedback control block FFB includes a comparison operation and a compensation current-calculation block IFP.

The target value Fpt (corresponding to a braking force required for the wheel WH) of a pressing force and the actual value Fpa (corresponding to a braking force actually generated) are compared with each other by the comparison operation. Here, the actual value Fpa of a pressing force is a detected value that is detected by the pressing force sensor FPA (for example, a fluid pressure sensor detecting the fluid pressure of the pressurizing cylinder KCL). A deviation (pressing force deviation) eFp between the target pressing force (target value) Fpt and the actual pressing force (detected value) Fpa is calculated in the comparison operation. The pressing force deviation eFp is input to the compensation current-calculation block IFP as a control variable.

The compensation current-calculation block IFP includes a proportional element block, a differential element block, and an integral element block. The pressing force deviation eFp is multiplied by a proportional gain Kp in the proportional element block, so that a proportional element of the pressing force deviation eFp is calculated. The pressing force deviation eFp is differentiated and is multiplied by a differential gain Kd in the differential element block, so that a differential element of the pressing force deviation eFp is calculated. The pressing force deviation eFp is integrated and is multiplied by an integral gain Ki in the integral element block, so that an integral element of the pressing force deviation eFp is calculated. Then, the proportional element, the differential element, and the integral element are added up, so that a compensation current Ifp is calculated. That is, in the compensation current-calculation block IFP, so-called PID control based on a pressing force is executed on the basis of a comparison result (pressing force deviation eFp) between the target pressing force Fpt and the actual pressing force Fpa so that the actual pressing force (detected value) Fpa matches the target pressing force (target value) Fpt (that is, a deviation eFp approaches "0 (zero)").

Target currents (target current vectors) Imt, which are the final target values of currents, are calculated in the target current-calculation block IMT on the basis of the command current Ims, the compensation current (a compensation value obtained through pressing force-feedback control) Ifp, and the rotation angle Mka. Each of the target currents Imt is a vector present on a d axis and a q axis, and is formed by a d-axis component (also referred to as a "d-axis target current) Idt and a q-axis component (also referred to as a "q-axis target current") Iqt. Meanwhile, the target current Imt is also written as a target current vector (Idt, Iqt). Detailed processing performed in the target current-calculation block IMT will be described later.

In the target current-calculation block IMT, the sign (the positive or negative of a value) of each target current Imt is determined on the basis of a direction where the electric motor MTR is to be driven (that is, a direction where a pressing force is increased or reduced). Further, the magnitude of each target current Imt is calculated on the basis of rotational power to be output from the electric motor MTR (that is, an increase or a reduction in a pressing force). Specifically, in a case where a pressing force is to be increased, the sign of each target current Imt is calculated as a positive sign (Imt>0) and the electric motor MTR is driven in a normal direction. On the other hand, in a case where a pressing force is to be reduced, the sign of each target current Imt is calculated as a negative sign (Imt<0) and the electric motor MTR is driven in a reverse direction. Furthermore, control is executed so that the output torque (rotational power) of the electric motor MTR is increased as the absolute value of each target current Imt is increased, and control is executed so that the output torque is reduced as the absolute value of each target current Imt is reduced.

In the switching control block SWT, drive signals Sux to Swz, which are required to perform pulse-width modulation on the respective switching elements SUX to SWZ, are calculated on the basis of each target current Imt (Idt, Iqt). Target values Emt of a U-phase voltage, a V-phase voltage, and a W-phase voltage (the generic name of target voltages Eut, Evt, and Ewt of the respective phases) are calculated on the basis of each target current Imt and the rotation angle Mka. The duty ratios Dtt of the pulse widths of the respective phases (the generic name of the duty ratios Dut, Dvt, and Dwt of the respective phases) are determined on the basis of the target voltages Emt of the respective phases. Here, "duty ratio" is a ratio of ON-time to one period and a duty ratio of "100%" corresponds to a state where a current fully flows. Then, the drive signals Sux to Swz, which are required to determine whether or not to make the respective switching elements SUX to SWZ of the three-phase bridge circuit be in an ON-state (a state where currents flow) or an OFF-state (a state where currents do not flow), are calculated on the basis of the duty ratios (target values) Dtt. The drive signals Sux to Swz are output to the drive circuit DRV.

States where currents flow in the six switching elements SUX to SWZ or the states where currents do not flows in the six switching elements SUX to SWZ are individually controlled by the six drive signals Sux to Swz. Here, as the duty ratios Dtt (the generic name of the duty ratios of the respective phases) are increased, a time when a current flows per unit time is lengthened in each switching element and a larger current flows in each of the coils CLU, CLV, and CLW. Accordingly, the rotational power of the electric motor MTR is increased.

In the drive circuit DRV, the current sensors IMA (the generic name of current sensors IUA, IVA, and IWA of the respective phases) are provided for the respective phases and actual currents Ima (the generic name of actual currents Iua, Iva, and Iwa of the respective phases) are detected. The detected values Ima (generic name) of the respective phases are input to the switching control block SWT. Then, so-called current feedback control is executed so that the detected values Ima of the respective phases match the target values Imt. Specifically, the duty ratios Dtt (the generic name of the duty ratios Dut, Dvt, and Dwt of the respective phases) are individually corrected (finely adjusted) on the basis of deviations eIm between the actual currents Ima and the target currents Imt of the respective phases so that the current deviations eIm approach "0". Highly accurate motor control can be achieved by this current feedback control.

The drive signals Vsm and Vkr, which are required to control the solenoid valves VSM and VKR, are calculated on the basis of the braking operation amount Bpa by the solenoid valve control block SLC. A case where the operation amount Bpa is smaller than the backlash value bp0 (particularly, a case where "Bpa=0" is satisfied) corresponds to a time where an braking operation is not performed and the drive signal Vsm is determined so that the simulator shut-off valve VSM is switched to the open position (for example, in a case where the shut-off valve VSM is an NC valve, the drive signal Vsm instructs the shut-off valve VSM not to be excited). Likewise, in a case where "Bpa<bp0" is satisfied, the drive signal Vkr is calculated so that "a state where the master cylinder MC and the wheel cylinder WC communicate with each other and the pressurizing cylinder KCL and the wheel cylinder WC are shut off from each other (referred to as a non-excited state)" is made.

A time after the braking operation amount Bpa is increased and the operation amount Bpa becomes equal to or larger than the backlash value bp0 corresponds to a time when a braking operation is performed, and the drive signal Vsm is determined so that the shut-off valve VSM is changed to the open position from the closed position at that time (a time when a braking operation is started). In a case where the shut-off valve VSM is an NC valve, an excitation command is started as the drive signal Vsm at the time of start of a braking operation. Further, the drive signal Vkr is determined at the time of start of a braking operation so that "a state where the master cylinder MC and the wheel cylinder WC are shut off from each other and the pressurizing cylinder KCL and the wheel cylinder WC communicate with each other (referred to as an excited state)" is made.

<Processing Performed in Wheel Slip-Suppression Control Block FSC and Target Pressing Force-Calculation Block FPT>

Figure 3:
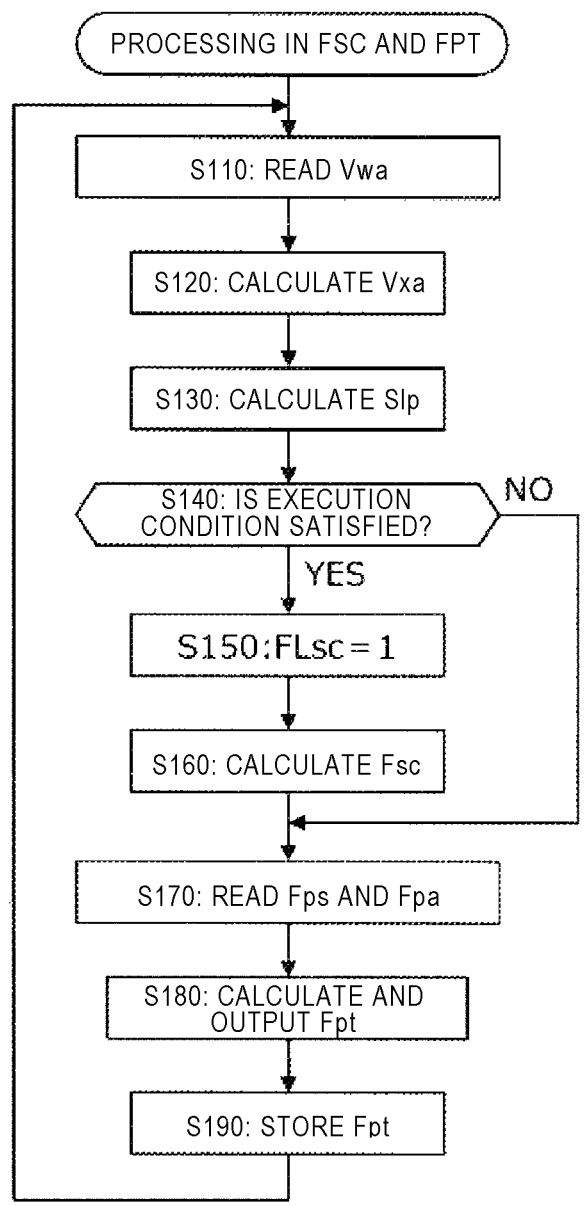
FIG. 3 is a flowchart illustrating processing performed in a wheel slip-suppression control block FSC and a target pressing force-calculation block FPT.

Processing performed in the wheel slip-suppression control block FSC and the target pressing force-calculation block FPT will be described with reference to a flowchart of FIG. 3.

The wheel speeds Vwa of the four wheels WH of the vehicle are read in Step S110. The wheel speeds Vwa are detected by the wheel speed sensors VWA that are provided on the respective wheels WH. The vehicle body speed Vxa is calculated in Step S120 on the basis of the wheel speeds Vwa. For example, the highest wheel speed among the four wheel speeds Vwa is employed as the vehicle body speed Vxa.

The wheel slip state quantity Slp of each wheel WH is calculated in Step S130 on the basis of the wheel speeds Vwa. The wheel slip state quantity Slp is a state quantity (variable) that represents the degree of slippage of the wheel WH. For example, a slip speed, which is a deviation between the vehicle body speed Vxa and the wheel speed Vwa, is employed as the wheel slip state quantity Slp. Further, a wheel deceleration, which is obtained by the differential of the wheel speed Vwa, is employed as the wheel slip state quantity Slp. That is, the wheel slip state quantity Slp is calculated on the basis of at least one of the wheel slip speed and the wheel deceleration. Here, the wheel slip speed is made dimensionless by the vehicle body speed Vxa, so that a wheel slip ratio is calculated. The wheel slip ratio can be employed as one wheel slip state quantity Slp.

In Step S140, it is determined "whether or not the execution condition of wheel slip-suppression control is satisfied". In a case where wheel slip-suppression control is antilock brake control, it is determined "whether or not the wheel slip state quantity Slp exceeds a predetermined quantity slx". Here, the predetermined quantity slx is a determination threshold value for antilock brake control, and is a predetermined value that is set in advance. Further, in a case where wheel slip-suppression control is electronic brake force-distribution control, it is determined "whether or not a difference between the front wheel slip speed and the rear wheel slip speed exceeds a predetermined speed slz (or whether or not a difference between a front wheel slip ratio and a rear wheel slip ratio exceeds the predetermined value slz)". Here, the predetermined speed slz is a determination threshold value for electronic brake force-distribution control, and is a predetermined value that is set in advance.

If the execution condition of wheel slip-suppression control is satisfied and the determination processing of Step S140 is affirmed ("YES" in Step S140), processing proceeds to Step S150. On the other hand, if the execution condition of wheel slip-suppression control is not satisfied and the determination processing of Step S140 is negated ("NO" in Step S140), processing proceeds to Step S170.

In Step S150, a control flag FLsc is set to "1". The control flag FLsc is a signal that represents the execution/non-execution of wheel slip-suppression control, and is set to "1" in a case where wheel slip-suppression control is executed and is set to "0" in a case where wheel slip-suppression control is not executed. Accordingly, when wheel slip-suppression control is started, the control flag FLsc is switched to "1" from "0". Further, when wheel slip-suppression control ends, the control flag FLsc is switched to "0" from "1".

An adjustment pressing force Fsc is calculated in Step S160 on the basis of the wheel slip state quantity Slp. The adjustment pressing force Fsc is a target value of a pressing force that is required to adjust the command pressing force Fps to calculate the final target pressing force Fpt. In a case where wheel slip-suppression control is antilock brake control, the adjustment pressing force Fsc is determined so that wheel slip is not increased excessively. Further, in a case where wheel slip-suppression control is electronic brake force-distribution control, the adjustment pressing force Fsc is determined so that rear wheel slip is in a predetermined range of front wheel slip.

The command pressing force Fps and the actual pressing force Fpa are read in Step S170. The command pressing force Fps is calculated on the basis of the braking operation amount Bpa.

A target pressing force Fpt is calculated in Step S180 on the basis of the command pressing force Fps, the actual pressing force Fpa, and the adjustment pressing force Fsc. If wheel slip-suppression control is not executed and the determination processing of Step S140 is negated, "FLsc=0" and "Fsc=0" are satisfied. In this case, in Step S180, the command pressing force Fps is determined as the target pressing force Fpt just as it is. Then, pressing force-feedback control is executed on the basis of the target pressing force Fpt (=Fps) and the actual pressing force Fpa.

If wheel slip-suppression control is executed (if the determination processing of Step S140 is affirmed), a target pressing force Fpt of the present calculation period is calculated in Step S180 on the basis of the target pressing force Fpt of a previous calculation period and the adjustment pressing force Fsc of the present calculation period. That is, the target pressing force Fpt of the present calculation period serves as a criterion and is adjusted by the adjustment pressing force Fsc of the present calculation period, so that the target pressing force Fpt the present calculation period is determined.

Particularly, at the time of start of wheel slip-suppression control (that is, in a corresponding calculation period), a target pressing force Fpt is determined in Step S180 on the basis of the actual pressing force Fpa and the adjustment pressing force Fsc. Specifically, in a calculation period where the control flag FLsc is switched to "1" from "0", the actual pressing force Fpa of the present calculation period (that is, the time of start of control) serves as a criterion and the adjustment pressing force Fsc of the present calculation period is added to the actual pressing force Fpa, so that the target pressing force Fpt of the present calculation period is calculated. In other words, when wheel slip-suppression control starts to be executed, the command pressing force Fps is corrected to be reduced sharply to the value of the actual pressing force Fpa that is obtained at the time of start of execution of control. As a result, a target pressing force Fpt is calculated.

The target pressing force (the present value) Fpt of Step S180 is stored in Step S190. The stored target pressing force Fpt is used as a criterion that is required to calculate a target pressing force Fpt in the next calculation period. That is, the past target pressing force Fpt (calculated in the previous time) is corrected after the start of wheel slip-suppression control by the adjustment pressing force Fsc, so that a new target pressing force Fpt (in the present calculation period) is determined.

In a case where the braking operation member BP is operated suddenly, the follow of the actual pressing force Fpa to an increase in the command pressing force Fps is temporally delayed. However, at a time when the start of wheel slip-suppression control is determined (in a calculation period), the command pressing force Fps is reduced sharply to the value of the actual pressing force Fpa that is obtained at that time. As a result, a target pressing force Fpt is calculated. For this reason, interference between pressing force-feedback control and wheel slip-suppression control is avoided, so that the actual pressing force Fpa is reduced with high responsiveness. As a result, the generation of excessive wheel slip caused by the above-mentioned follow delay can be suppressed. Further, even though the command pressing force Fps is large during the execution of wheel slip-suppression control, the target pressing force (the previous value) Fpt calculated previously serves as a criterion and the actual pressing force Fpa is controlled. For this reason, wheel slip-suppression control can be appropriately continued.

<Processing Performed in Target Current-Calculation Block IMT>

Figure 4:
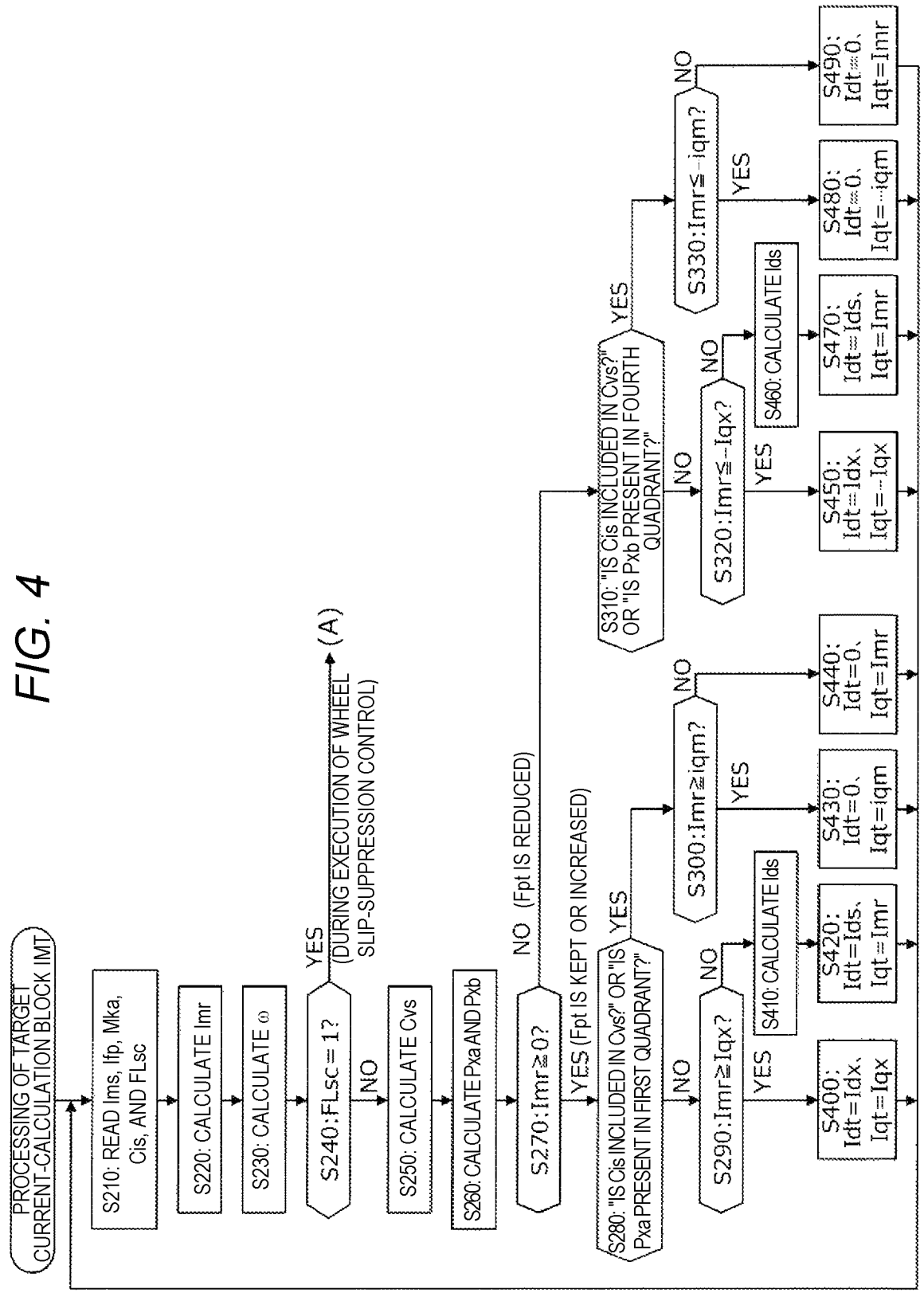
FIG. 4 is a flowchart illustrating processing performed in a target current-calculation block IMT (particularly, the flow of the processing in a case where wheel slip-suppression control is not executed).
Figure 5:
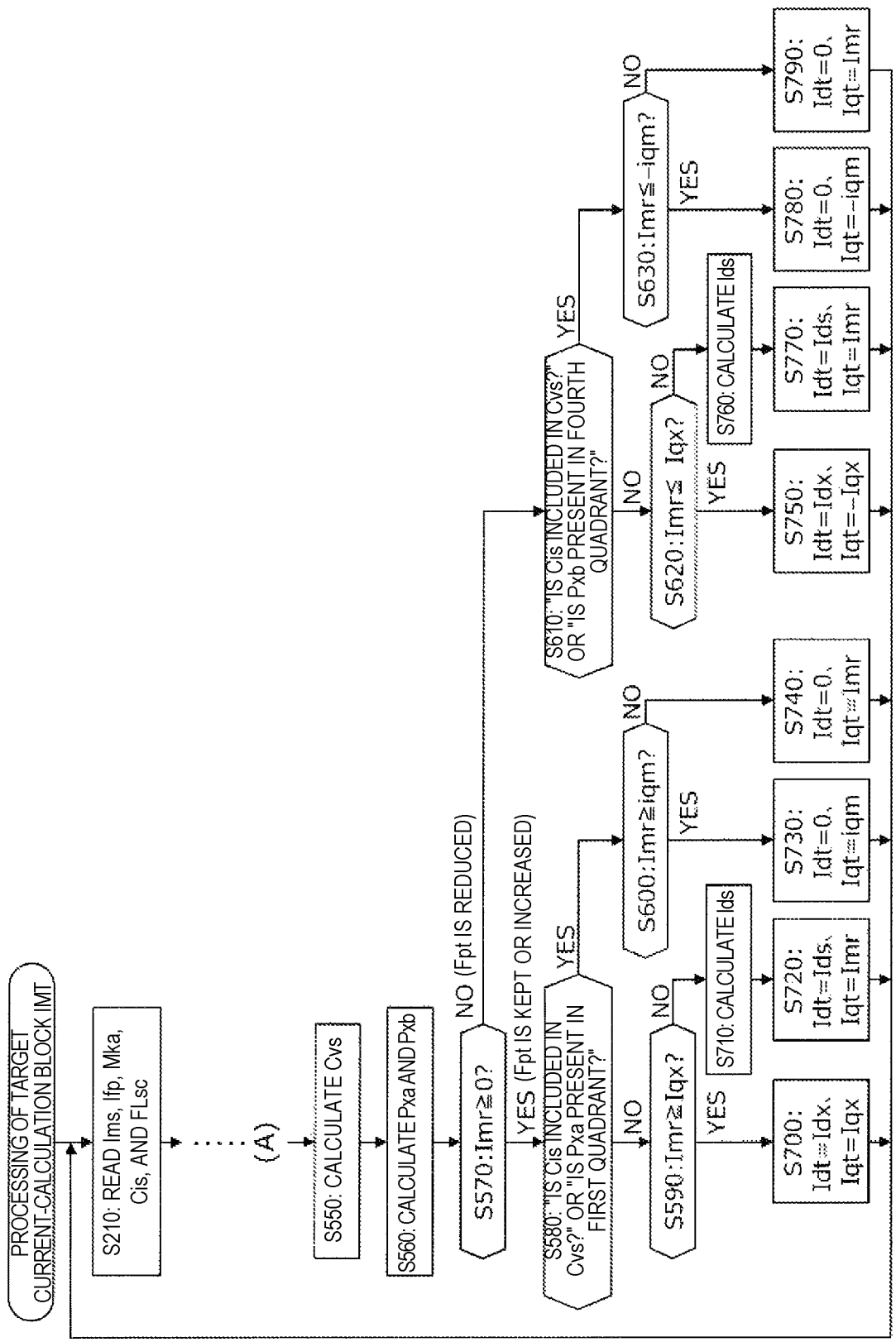
FIG. 5 is a flowchart illustrating processing performed in the target current-calculation block IMT (particularly, the flow of the processing in a case where wheel slip-suppression control is executed).
Figure 6:
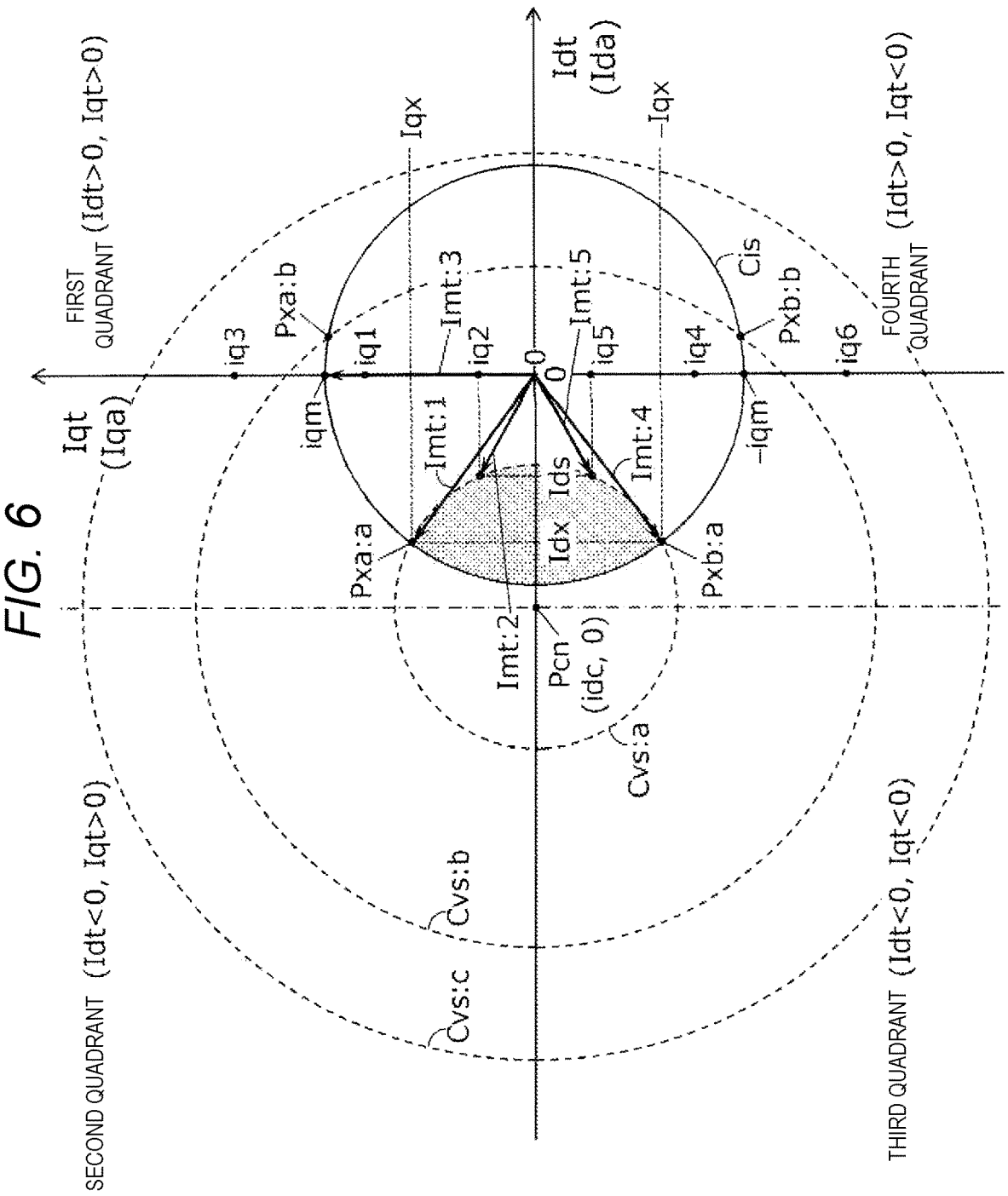
FIG. 6 is a characteristic diagram illustrating the processing performed in the target current-calculation block IMT.

Processing performed in the target current-calculation block IMT will be described with reference to flowcharts of FIGS. 4 and 5 and a characteristic diagram of FIG. 6. Here, FIG. 4 corresponds to processing in a case where wheel slip-suppression control is not executed, and FIG. 5 corresponds to processing in a case where wheel slip-suppression control is executed.

<<Flow of Processing at the Time of Non-Execution of Wheel Slip-Suppression Control>>

First, the flow of processing performed in the target current-calculation block IMT in a case where wheel slip-suppression control is not executed will be described with reference to the flowchart of FIG. 4.

The command current Ims, the compensation current Ifp, the rotation angle Mka, a current limit circle Cis, and the control flag FLsc are read in Step S210. Here, the current limit circle Cis is preset in current characteristics (dq-axis plane) of a q-axis current and a d-axis current of the electric motor MTR on the basis of allowable currents (the maximum current values of currents that can be made to flow) iqm of the switching elements SUX to SWZ (components of the drive circuit DRV). That is, the current limit circle Cis is determined from the specifications (particularly, rated current values iqm of the switching elements SUX to SWZ) of the drive circuit DRV. Here, a predetermined value iqm is referred to as "q-axis maximum current value".

A compensation command current Imr is calculated in Step S220 on the basis of the command current Ims and the compensation current Ifp based on pressing force-feedback control. Here, the compensation command current Imr is a command current that is compensated on the basis of pressing force-feedback control. Specifically, the compensation current Ifp is added to the command current Ims, so that the compensation command current Imr is determined (Imr=Ims+Ifp).

An electrical angular velocity ω of the electric motor MTR is calculated in Step S230 on the basis of the detected value (rotation angle) Mka of the rotation angle sensor MKA. Specifically, the rotation angle (mechanical angle) Mka is converted into an electrical angle θ and the electrical angle θ is differentiated with respect to time, so that the electrical angular velocity ω is determined. Here, the "mechanical angle Mka" corresponds to the rotation angle of an output shaft of the electric motor MTR. Further, the "electrical angle θ" is written as an angle in a case where one period of a magnetic field of the electric motor MTR is assumed as 2π [rad]. Meanwhile, the electrical angle θ can be directly detected by the rotation angle sensor MKA.

In Step S240, it is determined "whether or not wheel slip-suppression control is executed (that is, whether the control flag FLsc is "1" or "0")". If "FLsc=1" is satisfied and the determination processing of Step S140 is affirmed ("YES" in Step S240), processing proceeds to Step S550 (see (A)). On the other hand, if "FLsc=0" is satisfied and the determination processing of Step S140 is negated ("NO" in Step S240), processing proceeds to Step S250.

A voltage limit circle Cvs is calculated in Step S250 on the basis of the electrical angular velocity θ of the electric motor MTR. Specifically, the voltage limit circle Cvs is calculated in dq-axis current characteristics (Idt-Iqt plane) of the electric motor MTR on the basis of "predetermined values of each of a power supply voltage (that is, the voltage of a storage battery BAT or a generator ALT) Eba, phase inductances (that is, inductances of the coils CLU, CLV, and CLW) L, and the numbers w of interlinkage magnetic fluxes (that is, the strengths of magnets)" and "the electrical angular velocity ω of the electric motor MTR calculated from the rotation angle Mka". The radius of the voltage limit circle Cvs is reduced as a rotational speed dMk of the electric motor MTR is increased, and the radius of the voltage limit circle Cvs is increased as the rotational speed dMk is reduced.

Two points Pxa (Idx, Iqx) and Pxb (Idx, −Iqx) where the current limit circle Cis and the voltage limit circle Cvs cross each other on a dq-axis current plane are calculated in Step S260 on the basis of the current limit circle Cis and the voltage limit circle Cvs. Here, the values Idx and Iqx (or −Iqx) are variables that represent the coordinates of the intersections Pxa and Pxb on the d axis and the q axis. Further, the intersection Pxa (Idx, Iqx) corresponds to the normal direction of the electric motor MTR, and is referred to as a "first intersection Pxa". Furthermore, the intersection Pxb (Idx, −Iqx) corresponds to the reverse direction of the electric motor MTR, and is referred to as a "second intersection Pxb". The two intersections Pxa and Pxb are referred to as "intersections Px" as a generic name.

An area where the current limit circle Cis and the voltage limit circle Cvs overlap with each other is the range of a current that can be actually achieved by current feedback control (referred to as an "area where a current can flow"). Accordingly, even though a command corresponding to the outside of the area where a current can flow is made, this current command cannot be actually performed in current feedback control. Meanwhile, there is a case where the intersections Px (the generic name of Pxa and Pxb) are not present in a case where the rotational speed dMk is low (for example, in a case where the electric motor MTR stops).

In Step S270, it is determined "whether or not the compensation command current Imr is equal to or larger than "0"". That is, it is determined "whether or not the compensation command current Imr instructs the electric motor MTR to be driven in the normal direction or the reverse direction". If "Imr≥0" is satisfied and the determination processing of Step S270 is affirmed ("YES" in Step S270), processing proceeds to Step S280. On the other hand, if "Imr<0" is satisfied and the determination processing of Step S270 is negated ("NO" in Step S270), processing proceeds to Step S310.

In Step S280, it is determined "whether or not the current limit circle Cis is included in the voltage limit circle Cvs" or "whether or not the first intersection Pxa (Idx, Iqx) is present in a first quadrant on the dq-axis current plane". Here, the "first quadrant" is an area where both the d-axis current and the q-axis current have a positive sign. If the determination processing of Step S280 is affirmed ("YES" in Step S280), processing proceeds to Step S300. On the other hand, if the determination processing of Step S280 is negated ("NO" in Step S280), processing proceeds to Step S290.

In Step S290, it is determined "whether or not the compensation command current Imr is equal to or larger than the q-axis coordinate Iqx (variable) of the first intersection Pxa" on the basis of the compensation command current Imr and the coordinates (Idx, Iqx) of the first intersection Pxa. If the determination processing of Step S290 is affirmed ("YES" in Step S290), processing proceeds to Step S400. On the other hand, if the determination processing of Step S290 is negated ("NO" in Step S290), processing proceeds to Step S410.

In Step S300, it is determined "whether or not the compensation command current Imr is equal to or larger than a q-axis intersection iqm (q-axis maximum current value) of the current limit circle Cis" on the basis of the compensation command current Imr and the current limit circle Cis. If the determination processing of Step S300 is affirmed ("YES" in Step S300), processing proceeds to Step S430. On the other hand, if the determination processing of Step S300 is negated ("NO" in Step S300), processing proceeds to Step S440.

In Step S310, it is determined "whether or not the current limit circle Cis is included in the voltage limit circle Cvs" or "whether or not the second intersection Pxb (Idx, −Iqx) is present in a fourth quadrant on the dq-axis current plane". Here, the "fourth quadrant" is an area where both the d-axis current has a positive sign and the q-axis current has a negative sign. If the determination processing of Step S310 is affirmed ("YES" in Step S310), processing proceeds to Step S330. On the other hand, if the determination processing of Step S310 is negated ("NO" in Step S310), processing proceeds to Step S320.

In Step S320, it is determined "whether or not the compensation command current Imr is equal to or smaller than the q-axis coordinate −Iqx (variable) of the second intersection Pxb" on the basis of the compensation command current Imr and the coordinates (Idx, −Iqx) of the second intersection Pxb. If the determination processing of Step S320 is affirmed ("YES" in Step S320), processing proceeds to Step S450. On the other hand, if the determination processing of Step S320 is negated ("NO" in Step S320), processing proceeds to Step S460.

In Step S330, it is determined "whether or not the compensation command current Imr is equal to or smaller than a q-axis intersection −iqm (q-axis minimum current value) of the current limit circle Cis" on the basis of the compensation command current Imr and the current limit circle Cis. If the determination processing of Step S330 is affirmed ("YES" in Step S330), processing proceeds to Step S480. On the other hand, if the determination processing of Step S330 is negated ("NO" in Step S330), processing proceeds to Step S490.

In Step S400, an intersection-d-axis coordinate Idx (which is a variable and referred to as a "first intersection-d-axis coordinate") is determined as the d-axis target current and an intersection q-axis coordinate Iqx (which is a variable and referred to as a "first intersection q-axis coordinate") is determined as the q-axis target current Iqt (that is, "Idt=Idx and Iqt=Iqx"). In Step S410, a voltage limit circle-d-axis coordinate Ids (which is a variable and also simply referred to as a "limit circle-d-axis coordinate") is calculated on the basis of the compensation command current Imr and the voltage limit circle Cvs. Specifically, the limit circle-d-axis coordinate Ids is the d-axis coordinate of a point where the voltage limit circle Cvs and "Iqt=Imr" cross each other. That is, the limit circle-d-axis coordinate Ids is the value (coordinate) of the d-axis target current Idt on the voltage limit circle Cvs in a case where the compensation command current Imr is put into the q-axis target current Iqt (see Equation (2) to be described later). Then, in Step S420, the d-axis target current Idt is determined to match the voltage limit circle-d-axis coordinate Ids and the q-axis target current Iqt is determined to match the compensation command current Imr (that is, "Idt=Ids and Iqt=Imr").

In Step S430, "0" is determined as the d-axis target current Idt and the q-axis maximum current value iqm (predetermined value) is determined as the q-axis target current Iqt (that is, "Idt=0 and Iqt=iqm"). In Step S440, the d-axis target current Idt is determined to match "0" and the q-axis target current Iqt is determined to match the compensation command current Imr (that is, Idt=0 and Iqt=Imr).

In Step S450, an intersection-d-axis coordinate Idx (which is a variable and referred to as a "second intersection-d-axis coordinate") is determined as the d-axis target current Idt and an intersection q-axis coordinate Iqx (which is a variable and referred to as a "second intersection q-axis coordinate") is determined as the q-axis target current Iqt (that is, "Idt=Idx and Iqt=−Iqx"). In Step S460, as in Step S410, a limit circle-d-axis coordinate Ids (which is the value of the d-axis target current Idt on the voltage limit circle Cvs in a case where "Iqt=Imr" is satisfied) is calculated on the basis of the compensation command current Imr and the voltage limit circle Cvs. Then, in Step S470, the d-axis target current Idt is determined to match the limit circle-d-axis coordinate Ids and the q-axis target current Iqt is determined to match the compensation command current Imr (that is, "Idt=Ids and Iqt=Imr").

In Step S480, "0" is determined as the d-axis target current Idt and the q-axis minimum current value-iqm (predetermined value) is determined as the q-axis target current Iqt (that is, "Idt=0 and Iqt=−iqm"). In Step S490, the d-axis target current Idt is determined to match "0" and the q-axis target current Iqt is determined to match the compensation command current Imr (that is, Idt=0 and Iqt=Imr). The flow of processing at the time of non-execution of wheel slip-suppression control has been described above.

<<Flow of Processing at the Time of Execution of Wheel Slip-Suppression Control>>

Next, the flow of processing performed in the target current-calculation block IMT in a case where wheel slip-suppression control is executed will be described with reference to the flowchart of FIG. 5. Since processing of Steps S210 to S240 is common, the description thereof will be omitted.

Processing of Steps S550 to S630 is the same as processing of Steps S250 to S330. Further, processing of Steps S700 to S790 is the same as processing of Steps S400 to S490 in the determination of the d-axis target current Idt and the q-axis target current Iqt. Accordingly, processing in a case where wheel slip-suppression control is executed, which will be described with reference to FIG. 5, can be replaced with the processing in a case where wheel slip-suppression control is not executed that has been described with reference to FIG. 4. Specifically, in regard to the front half portion of the reference numeral of each step, a case where "S2" is replaced with "S5", "S3" is replaced with "S6", and "S4" is replaced with "S7" corresponds to the description of processing in a case where wheel slip-suppression control is executed.

<<Target Current Vector Imt (Idt, Iqt) in Interrelationship Between Current Limit Circle Cis and Voltage Limit Circle Cvs>>

Next, processing for determining the target current vector Imt (Idt, Iqt) (that is, processing of Steps S400 to S490 and processing of Steps S700 to S790) will be described with reference to the characteristic diagram of FIG. 6. Meanwhile, Steps S400 to S440 and Steps S700 to S740 correspond to a case where the electric motor MTR is driven in the normal direction (that is, "Imr0"). Further, Steps S450 to S490 and Steps S750 to S790 correspond to a case where the electric motor MTR is driven in the reverse direction (that is, "Imr<0").

The current limit circle Cis is determined on the basis of the maximum rated values (rated currents iqm) of the switching elements of the drive circuit DRV (particularly, a bridge circuit BRG). Here, the maximum rated value is determined as the maximum allowable values of a current that can flows in a switching element (a power MOS-FET, or the like), a voltage that can be applied to the switching element, power loss, or the like.

Specifically, the current limit circle Cis is expressed as a circle having a center at an origin O (a point where "Idt=0 and Iqt=0" is satisfied) in dq-axis current characteristics (Idt-Iqt plane). Further, the radii of the current limit circle Cis are allowable current values iqm (predetermined values) of the switching elements SUX to SWZ. That is, the current limit circle Cis crosses the q axis at a point (0, iqm) and a point (iqm, 0), and crosses the d axis at a point (−iqm, 0) and a point (iqm, 0). The current limit circle Cis is determined in the dq-axis current characteristics by Equation (1).

$$Idt^2+Iqt^2=iqm^2 \qquad \text{Equation (1)}$$

Further, the voltage limit circle Cvs is determined in the dq-axis current characteristics of the electric motor MTR by Equation (2).

$$\{Idt+(\varphi/L)\}^2+Iqt^2=\{Eba/(L\cdot\omega)\}^2 \qquad \text{Equation (2)}$$

Here, "Eba" denotes a power supply voltage (that is, the voltage of the storage battery BAT or the generator ALT), "L" denotes a phase inductance, and "φ" denotes the number of interlinkage magnetic fluxes (the strength of a magnet). Further, "ω" denotes the electrical angular velocity of the electric motor MTR. Meanwhile, the electrical angular velocity ω is the amount of change of the electrical angle θ of the electric motor MTR (an angle in a case where one period of a magnetic field of the electric motor MTR is assumed as 2π [rad]) with respect to time, and is calculated from the rotation angle Mka.

The coordinates of a center Pcn (idc, 0) of the voltage limit circle Cvs are (−(φ/L), 0), and the voltage limit circle Cvs is expressed as a circle having a radius of "Eba/(L·ω)". The power supply voltage Eba has a predetermined value (constant), and the electrical angular velocity ω is increased as the rotational speed dMk is increased. For this reason, the radius of the voltage limit circle Cvs is reduced as the rotational speed dMk is increased. Conversely, the radius of the voltage limit circle Cvs is increased as the rotational speed dMk is reduced.

A case where the rotational speed dMk (that is, the electrical angular velocity ω) of the electric motor MTR is relatively high is illustrated by a voltage limit circle Cvs: a. In this state, the current limit circle Cis and the voltage limit circle Cvs:a cross each other at two points Pxa:a and Pxb:a in an interrelationship between the current limit circle Cis and the voltage limit circle Cvs:a. In this state, the first intersection Pxa:a is present in a second quadrant but the second intersection Pxb:a is present in a third quadrant. Accordingly, the determination processing of Steps S280, S310, S580, and S610 is negated.

Meanwhile, the intersection Pxa (first intersection), where the q-axis target current Iqt has a positive sign, of the two intersections Pxa and Pxb corresponds to the normal direction of the electric motor MTR. Further, the intersection Pxb (second intersection), where the q-axis target current Iqt has a negative sign, of the two intersections Pxa and Pxb corresponds to the reverse direction of the electric motor MTR.

In a case where "Imr=iq1(>Iqx)" is satisfied in this state so that the electric motor MTR is driven in the normal direction, the determination processing of Steps S290 and S590 is affirmed. Then, "Idt=Idx and Iqt=Iqx" is determined in Steps S400 and S700. That is, the d-axis component and the q-axis component of the target current vector Imt are limited to a first intersection-d-axis coordinate Idx and a first intersection q-axis component Iqx on the basis of the coordinates (Idx, Iqx) of the first intersection Pxa.

Further, in a case where "Imr=iq4(<-Iqx)" is satisfied so that the electric motor MTR is driven in the reverse direction, the determination processing of Steps S320 and S620 is affirmed. Then, "Idt=Idx and Iqt=-Iqx" is determined in Steps S450 and S750. That is, the d-axis component and the q-axis component of the target current vector Imt are limited to a second intersection-d-axis coordinate Idx and a second intersection q-axis component -Iqx on the basis of the coordinates (Idx, -Iqx) of the second intersection Pxb.

In the flowing of a current to the electric motor MTR, in current feedback control, the d-axis current and the q-axis current, which can be made to actually flow, correspond to an area (which is illustrated by hatching, an area where a current can flow) where the current limit circle Cis and the voltage limit circle Cvs overlap with each other. Since the driving of the electric motor MTR is inefficient in a case where control is executed outside the area where a current can flow, there is a case where the switching element may be overloaded (a current exceeding a rated current may be applied to the switching element) sometimes.

The intersections Pxa:a and Pxb:a, which are positioned on the boundary of the area where a current can flow, are points where an output (the amount of work per unit time, power) is maximum. For this reason, in a case where the rotational speed dMk is relatively high and the absolute value of the compensation command current Imr is relatively large, a vector Imt:1 (a vector directed to the first intersection Pxa:a from the origin O) and a vector Imt:4 (a vector directed to the second intersection Pxb:a from the origin O) are determined as the target current Imt so that the output (power) of the electric motor MTR becomes maximum.

The first intersection Pxa:a where the q-axis target current Iqt has a positive sign is a point where the output of the electric motor MTR is maximum in a case where the electric motor MTR is driven in the normal direction. For example, in a case where the braking operation member BP is operated suddenly and the electric motor MTR is suddenly accelerated from a state where the electric motor MTR stops, the first intersection Pxa:a is determined as the target current vector Imt:1. The first intersection Pxa (Idx, Iqx) is determined as the target current vector Imt (Idt, Iqt), so that the actual pressing force Fpa can be increased most efficiently with high responsiveness.

The second intersection Pxb:a where the q-axis target current Iqt has a negative sign is a point where the output of the electric motor MTR is maximum in a case where the electric motor MTR is driven in the reverse direction. For example, in a case where wheel slip-suppression control is started and the electric motor MTR is suddenly stopped in a state where the electric motor MTR is driven in the normal direction, the second intersection Pxb:a is determined as the target current vector Imt:4. The second intersection Pxb (Idx, -Iqx) is determined as the target current vector Imt (Idt, Iqt), so that the actual pressing force Fpa can be reduced most efficiently with high responsiveness.

On the other hand, in a case where the absolute value of the compensation command current Imr is relatively small (for example, in a case where "Imr=iq2(<Iqx)" and "Imr=iq5(>-Iqx)" are satisfied), the determination processing of Steps S290, S320, S590, and S620 is negated. Then, a voltage limit circle-d-axis coordinate Ids is calculated in Steps S410, S460, S710, and S760 on the basis of the compensation command current Imr and the voltage limit circle Cvs. The limit circle-d-axis coordinate Ids is the value (coordinate) of the d-axis target current Idt on the voltage limit circle Cvs in a case where the q-axis target current Iqt is the compensation command current Imr. Specifically, a d-axis target current Idt, which is calculated in a case where the compensation command current Imr is put into the q-axis target current Iqt of Equation (2), is employed as the limit circle-d-axis coordinate Ids. "Idt=Ids and Iqt=Imr" is determined in Steps S420, S470, S720, and S770. That is, the q-axis current is limited by the limit circle-d-axis coordinate Ids, so that the target current Imt is determined as vectors Imt:2 and Imt:5. Since the d-axis target current Idt is sufficiently ensured in the area where a current can flow even in this case, the responsiveness of the electric motor MTR can be improved. In addition, since the d-axis target current Idt is set on the voltage limit circle Cvs, the electric motor MTR can be efficiently driven and heat to be generated can be reduced.

A case where the rotational speed dMk is relatively low is illustrated by a voltage limit circle Cvs:b. In this state, the current limit circle Cis and the voltage limit circle Cvs:b cross each other at points Pxa:b and Pxb:b in an interrelationship between the current limit circle Cis and the voltage limit circle Cvs:b. In this state, the first intersection Pxa:b is present in a first quadrant and the second intersection Pxb:b is present in a fourth quadrant. Accordingly, the determination processing of each of Steps S280, S310, S580, and S610 is affirmed.

In a case where "Imr=iq3(>iqm)" is satisfied in this state so that the electric motor MTR is driven in the normal direction, the determination processing of Steps S300 and S600 is affirmed. Then, "Idt=0 and Iqt=iqm" is determined in Steps S430 and S730. That is, a vector Imt:3 (a vector directed to a point (0, iqm) from the origin O) is calculated as the target current vector Imt. Further, in a case where "Imr=iq6(<-iqm)" is satisfied so that the electric motor MTR is driven in the reverse direction, the determination processing of Steps S330 and S630 is affirmed. Then, "Idt=0 and Iqt=−imq" is determined in Steps S480 and S780.

In a case where the rotational speed dMk is relatively low, control for weakening magnetic fluxes is unnecessary and "Idt=0" is satisfied. The d-axis current and the q-axis current are in a trade-off relationship. For this reason, in a case where the d-axis target current Idt becomes "0", the q-axis target current Iqt acting in the direction of torque can be utilized as much as possible in the flowing of a current to the electric motor MTR.

A case where the rotational speed dMk is lower and the electric motor MTR substantially stops is illustrated by a voltage limit circle Cvs:c. Since the current limit circle Cis is included in the voltage limit circle Cvs:c in this state, there is no intersection Px. Accordingly, the determination processing of each of Steps S280, S310, S580, and S610 is affirmed as described above. In addition, the determination processing of each of Steps S300, S330, S600, and S630 is negated. Then, "Idt=0 and Iqt=Imr" is determined in each of Steps S440, S490, S740, and S790. Even in this case, control for weakening magnetic fluxes is unnecessary and the electric motor MTR is driven on the basis of only a required compensation command current Imr (that is, required torque).

Further, in a case where the rotational speed dMk is relatively low, points (0, iqm) and (0, −iqm), which are positioned on the boundary of the area where a current can flow, are points where an output is maximum. For this reason, in a case where the absolute value of the compensation command current Imr is instructed to exceed the q-axis maximum current value iqm, the absolute value of the compensation command current Imr is limited to the q-axis maximum current value (rated current value) iqm. On the other hand, in a case where the absolute value of the compensation command current Imr is smaller than the q-axis maximum current value iqm, the compensation command current Imr is not limited and the compensation command current Imr becomes the q-axis component of the target current vector Imt just as it is.

<Processing Performed in Switching Control Block SWT and Drive Circuit DRV of Three-Phase Brushless Motor>

Figure 7:
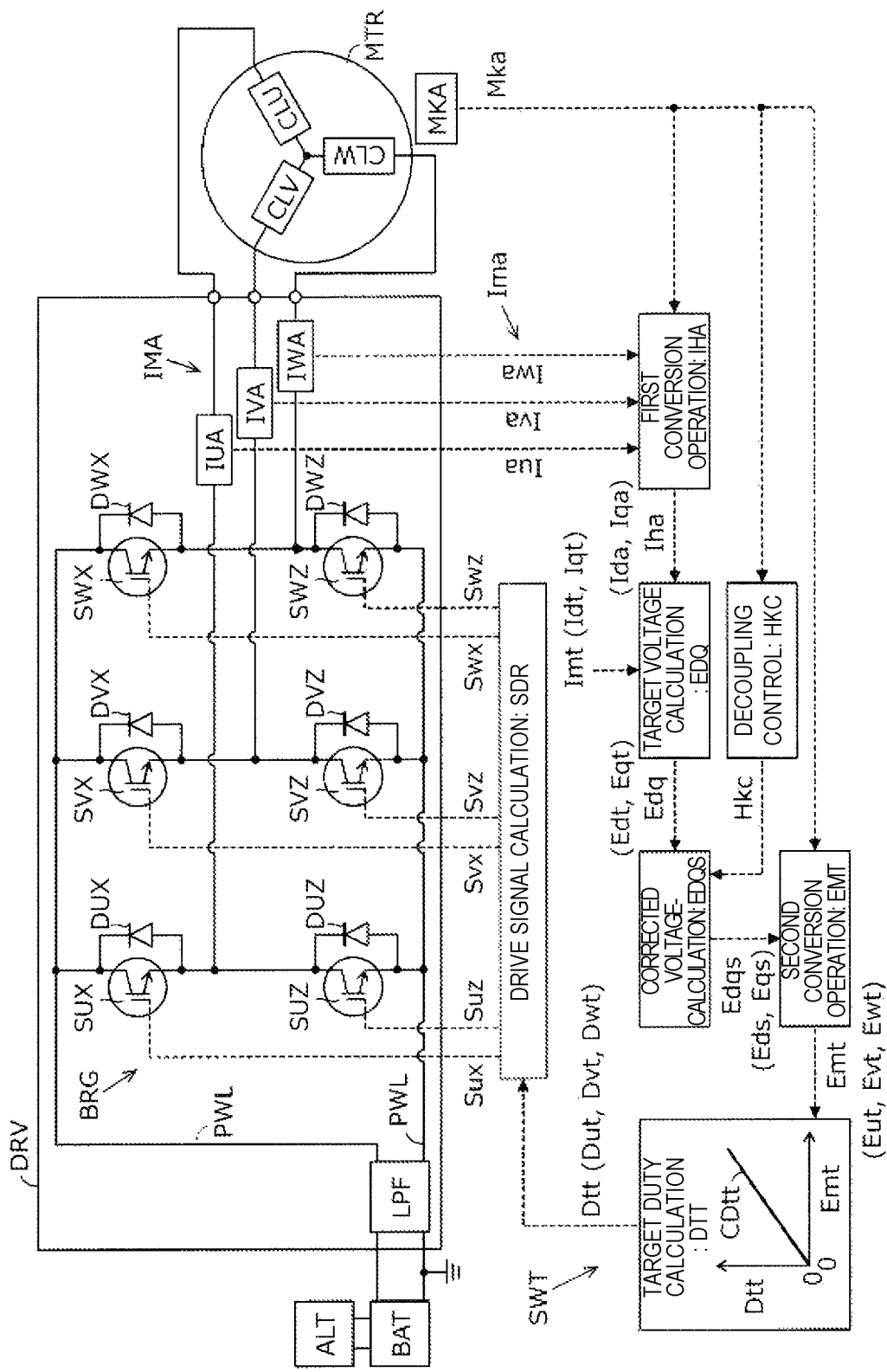
FIG. 7 is a schematic diagram illustrating processing, which is performed in a switching control block SWT, and a drive circuit DRV of a three-phase brushless motor.

Processing performed in the switching control block SWT and the drive circuit DRV of a three-phase brushless motor will be described with reference to a schematic diagram of FIG. 7. The three-phase brushless motor MTR includes three coils (winding wires) of a U-phase coil CLU, a V-phase coil CLV, and a W-phase coil CLW. The electric motor MTR is provided with the rotation angle sensor MKA that detects the rotation angle (rotor position) Mka of the electric motor MTR. The rotation angle Mka is input to the switching control block SWT of the controller ECU.

<<Processing Performed in Switching Control Block SWT>>

First, processing performed in the switching control block SWT will be described. In the switching control block SWT, the drive signals Sux, Suz, Svx, Svz, Swx, and Swz (that is, Sux to Swz) of the switching elements SUX, SUZ, SVX, SVZ, SWX, and SWZ (that is, SUX to SWZ) of a three-phase bridge circuit BRG are determined on the basis of the target currents Imt, the actual current values (detected values) Ima, and the rotation angle Mka (detected value) of the electric motor MTR.

In the switching control block SWT, the duty ratios of pulse widths (each of which is a ratio of ON-time to one period) are determined on the basis of the magnitudes of the target currents Imt and preset characteristics (calculation map). In addition, the rotation direction of the electric motor MTR is determined on the basis of the sign (positive or negative) of the target current Imt. For example, the target current Imt is set as a positive value in a case where the rotation direction of the electric motor MTR is a normal direction, and is set as a negative value in a case where the rotation direction of the electric motor MTR is a reverse direction. Since a final output voltage is determined depending on an input voltage (the voltage of the storage battery BAT) and the duty ratios Dtt, the rotation direction and output torque of the electric motor MTR are determined. Specifically, as the duty ratio Dtt is higher, a time when a current flows in the switching element per unit time is lengthened and a larger current flows in the electric motor MTR. As a result, the output (rotational power) of the electric motor MTR is increased.

The switching control block SWT includes a first conversion operation block IHA, a target voltage-calculation block EDQ, a decoupling control block HKC, a corrected voltage-calculation block EDQS, a second conversion operation block EMT, a target duty-calculation block DTT, and a drive signal-calculation block SDR. The electric motor MTR is driven by so-called vector control.

Converted actual currents Iha are calculated on the basis of the actual currents Ima and the rotation angle Mka by the first conversion operation block IHA. The converted actual currents Iha are currents which are obtained through the three-phase/two-phase conversion of the actual currents Ima and of which fixed coordinates are converted into rotational coordinates. The converted actual current Iha is a vector present on a d axis and a q axis (rotor-fixed coordinates), and is formed by a d-axis component (also referred to as a "d-axis actual current") Ida and a q-axis component (also referred to as a "q-axis actual current") Iqa.

The actual currents Ima are subjected to three-phase/two-phase conversion in the first conversion operation block IHA. The actual currents Ima are the generic name of the respective phases (a U-phase, a V-phase, and a W-phase) of the bridge circuit BRG, and are formed of, specifically, a U-phase actual current Iua, a V-phase actual current Iva, and a W-phase actual current Iwa. Calculation performed in a 3-dimensional space is required to simultaneously deal with three signals. For the facilitation of calculation, three-phase actual currents Ima (Iua, Iva, and Iwa) are converted into two-phase actual currents Ina (Iα and Iβ) by using a fact that "Iua+Iva+Iwa=0" is satisfied in the case of ideal three-phase alternating currents (so-called Clarke transformation).

The three-phase actual currents (detected values) Iua, Iva, and Iwa are converted into two-phase actual currents Iα and Iβ by Clarke transformation. That is, actual currents Iua, Iva, and Iwa of symmetrical three-phase alternating currents (three-phase alternating currents of which phases are shifted by 120°) are converted into actual currents Iα and Iβ that are two-phase alternating currents equivalent to the actual currents Iua, Iva, and Iwa.

In addition, in the first conversion operation block IHA, coordinate transformation to rotational coordinates from fixed coordinates (stationary coordinates) is performed on the basis of the rotation angle Mka and converted actual currents Iha are calculated. The converted actual current Iha is formed by a d-axis component (a d-axis actual current) Ida and a q-axis component (q-axis actual current) Iqa. That is, since the actual current Ina subjected to Clarke transformation is a current flowing in a rotor, the coordinates are transformed into rotor-fixed coordinates (which are rotational coordinates and dq-axis coordinates) (so-called Park transformation). Transformation to the rotational coordinates (dq-axis coordinates) from the fixed coordinates is performed on the basis of a rotor rotation angle Mka obtained from the rotation angle sensor MKA, so that an actual current Iha (Ida, Iqa) having been subjected to coordinate transformation is determined.

A target voltage vector Edq is calculated on the basis of the target current vector Imt (Idt, Iqt) and the actual current Iha (Ida, Iqa), which has been subjected to Park Transformation, by the target voltage-calculation block EDQ. So-called current feedback control is executed in the vector control so that "the d-axis component Idt and the q-axis component Iqt of the target current" match "the d-axis component Ida and the q-axis component Iqa of the actual current". Accordingly, PI control is executed in the target voltage-calculation block EDQ on the basis of deviations (current deviations) between "the d-axis component Idt and the q-axis component Iqt" and "the d-axis component Ida and the q-axis component Iqa". P control (which is proportional control and is executed according to a deviation between a target value and an actual value) and I control (which is integral control and is executed according to an integrated value of the deviation) are executed in the PI control in parallel.

Specifically, a target voltage Edq is determined in the target voltage-calculation block EDQ on the basis of a deviation between the target current Imt and the converted actual current Iha so that the current deviation is reduced. The target voltage Edq is a vector present on the d axis and the q axis (rotor-fixed coordinates), and is formed by a d-axis component (also referred to as a "d-axis target voltage") Edt and a q-axis component (also referred to as a "q-axis target voltage") Eqt.

An interference component required to correct the target voltages Edt and Eqt is calculated in the decoupling control block HKC. The reason for the name of the interference component is that not only an increase in a d-axis current but also a change in a q-axis current is caused by an increase in a d-axis voltage is increased (referred to as an "interference component"). This interference component is present even for a q-axis current. In addition, a counter-electromotive force is also considered in the decoupling control block HKC. The reason for this is that a counter-electromotive force acting so as to reduce a current is generated in a case where the electric motor MTR is driven.

Specifically, a compensation component for the interference of the q-axis current is calculated as "$-\omega \cdot Iqt \cdot L$" in the decoupling control block HKC on the basis of the electrical angular velocity $\omega$, the q-axis target current Iqt, and a coil inductance L. Likewise, a compensation component for the interference of the d-axis current is calculated as "$\omega \cdot Idt \cdot L$". Further, a compensation component for the counter-electromotive force is calculated as "$\omega \cdot \varphi$" on the basis of the electrical angular velocity $\omega$ and the field magnetic fluxes $\varphi$ of a magnet. Then, the respective calculation results are input to the corrected voltage-calculation block EDQS as compensation values Hkc.

A corrected voltage vector Edqs (Eds, Eqs) is calculated in the corrected voltage-calculation block EDQS on the basis of the target voltage vector Edq (Edt, Eqt) and the compensation values Hkc. Here, the corrected voltage vector Edqs (Eds, Eqs) is a target vector of a final voltage, and is obtained through the correction of the target voltage vector Edq performed by the compensation values Hkc. Specifically, a d-axis component Eds and a q-axis component Eqs of the corrected voltage Edqs are calculated by Equations (3) and (4) to be described below.

$$Eds = Edt - \omega \cdot Iqt \cdot L \qquad \text{Equation (3)}$$

$$Eqs = Eqt + \omega \cdot Idt \cdot L + \omega \cdot \varphi \qquad \text{Equation (4)}$$

Meanwhile, the second term of Equation (3) is a compensation term for the interference of the q-axis current. Further, the second term of Equation (4) is a compensation term for the interference of the d-axis current, and the third terms of Equation (4) is a compensation term for the counter-electromotive force.

A final target voltage Emt is calculated on the basis of the corrected voltage vector Edqs and the rotation angle Mka by the second conversion operation block EMT. The target voltage Emt is the generic name of target voltages of the respective phases of the bridge circuit BRG, and is formed by a U-phase target voltage Eut, a V-phase target voltage Evt, and a W-phase target voltage Ewt.

First, the corrected voltage vector Edqs is subjected to inverse coordinate transformation to the fixed coordinates from the rotational coordinates in the second conversion operation block EMT on the basis of the rotation angle Mka, so that two-phase target voltages E$\alpha$ and E$\beta$ are calculated (so-called inverse Park Transformation). Then, the two-phase target voltages E$\alpha$ and E$\beta$ are inversely transformed into three-phase target voltages Emt (voltage target values Eut, Evt, and Ewt of the respective phases) by space vector transformation.

Duty ratios (target values) Dtt of the respective phases are calculated on the basis of the target voltages Emt of the respective phases by the target duty-calculation block DTT. The duty ratios Dtt are the generic name of the duty ratios of the respective phases, and are formed of a U-phase duty ratio Dut, a V-phase duty ratio Dvt, and a W-phase duty ratio Dwt. Specifically, the duty ratio Dtt is calculated so as to be monotonically increased from "0" as the voltage target value Emt of each phase is increased from "0" according to calculation characteristics CDtt.

Signals Sux to Swz required to drive the switching elements SUX to SWZ, which form the respective phases, of the bridge circuit BRG are determined on the basis of the duty ratios Dtt by the drive signal-calculation block SDR. The ON/OFF of the respective switching elements SUX to SWZ are switched on the basis of the respective drive signals Sux to Swz, so that the electric motor MTR is driven. Processing performed in the switching control block SWT has been described above.

<<Drive Circuit DRV>>

Next, the drive circuit DRV will be described. The drive circuit DRV includes a three-phase bridge circuit BRG and a stabilization circuit LPF. The drive circuit DRV is an electrical circuit that drives the electric motor MTR, and is controlled by the switching control block SWT.

The bridge circuit BRG (also referred to as an inverter circuit) includes six switching elements (power transistors) SUX, SUZ, SVX, SVZ, SWX, and SWZ (SUX to SWZ). The bridge circuit BRG is driven on the basis of the drive signals Sux, Suz, Svx, Svz, Swx, and Swz (Sux to Swz) of the respective phases that are output from the switching control block SWT provided in the drive circuit DRV, so that the output of the electric motor MTR is adjusted.

The six switching elements SUX to SWZ are elements that can turn on or off a part of the electrical circuit. For example, MOS-FETs or IGBTs are employed as the switching elements SUX to SWZ. The switching elements SUX to SWZ of the bridge circuit BRG are controlled in the brushless motor MTR on the basis of the detected value Mka of a rotation angle (rotor position). Further, the directions of the currents (that is, excitation directions) of the coils CLU, CLV, and CLW of the three phases (a U-phase, a V-phase, and a W-phase) are sequentially switched, so that the electric motor MTR is rotationally driven. That is, the rotation direction (the normal direction or the reverse direction) of the brushless motor MTR is determined according to a relationship between the rotor and a position where excitation occurs. Here, the normal direction of the electric motor MTR is a rotation direction corresponding to an increase in the pressing force Fpa generated by the pressurizing unit KAU, and the reverse direction of the electric motor MTR is a rotation direction corresponding to a reduction in the pressing force Fpa.

Current sensors IMA (generic name), which detect actual currents Ima (the generic name of actual currents of the respective phases) between the bridge circuit BRG and the electric motor MTR, are provided for the respective phases (a U-phase, a V-phase, and a W-phase). Specifically, a U-phase current sensor IUA detecting a U-phase actual current Iua, a V-phase current sensor IVA detecting a V-phase actual current Iva, and a W-phase current sensor IWA detecting a W-phase actual current Iwa are provided for the respective phases. The detected currents Iua, Iva, and Iwa of the respective phases are input to the switching control block SWT.

Then, the above-mentioned current feedback control is executed in the switching control block SWT. The duty ratios Dtt are corrected (finely adjusted) on the basis of deviations elm between the actual currents Ima and the target currents Imt. The actual values Ima are controlled by the current feedback control so that the actual values Ima match the target values Imt (that is, the current deviations elm approach "0"). As a result, highly accurate motor control can be achieved.

The drive circuit DRV receives power supplied from a power source (the storage battery BAT or the generator ALT). The drive circuit DRV is provided with a stabilization circuit LPF to reduce a variation in the supplied power (voltage). The stabilization circuit LPF is formed of a combination of at least one condenser (capacitor) and at least one inductor (coil), and is a so-called LC circuit. The drive circuit DRV has been described above.

<Effects>

Figure 8:
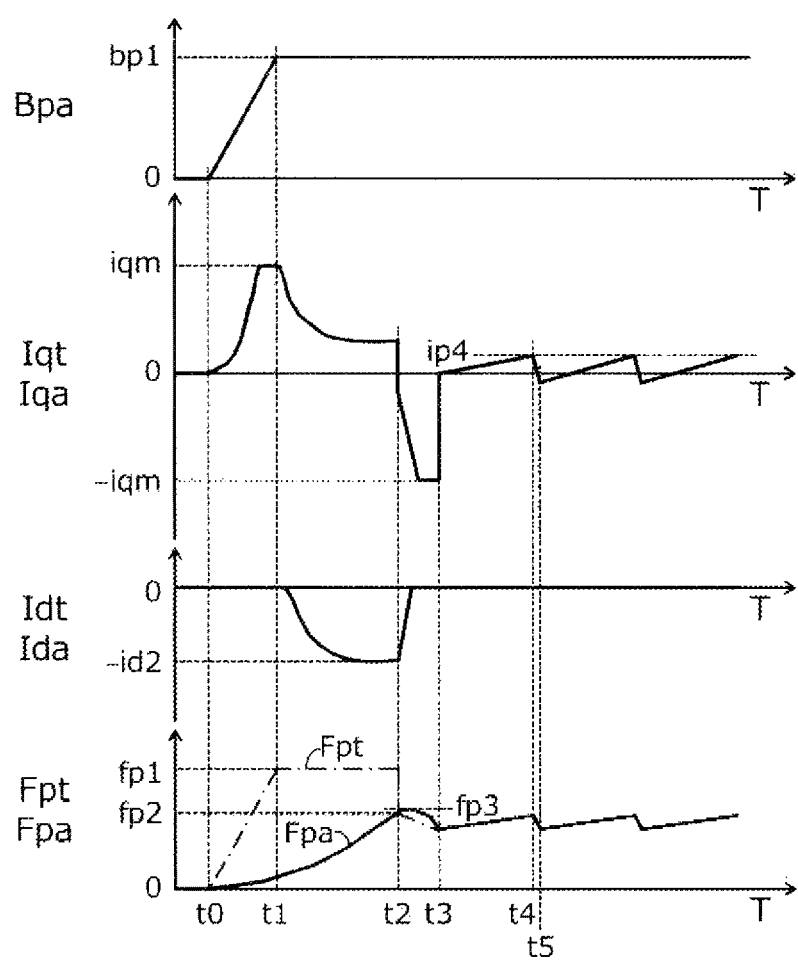
FIG. 8 is a time series diagram illustrating the effects of the braking control device BCS for a vehicle according to the invention.
Figure 9:
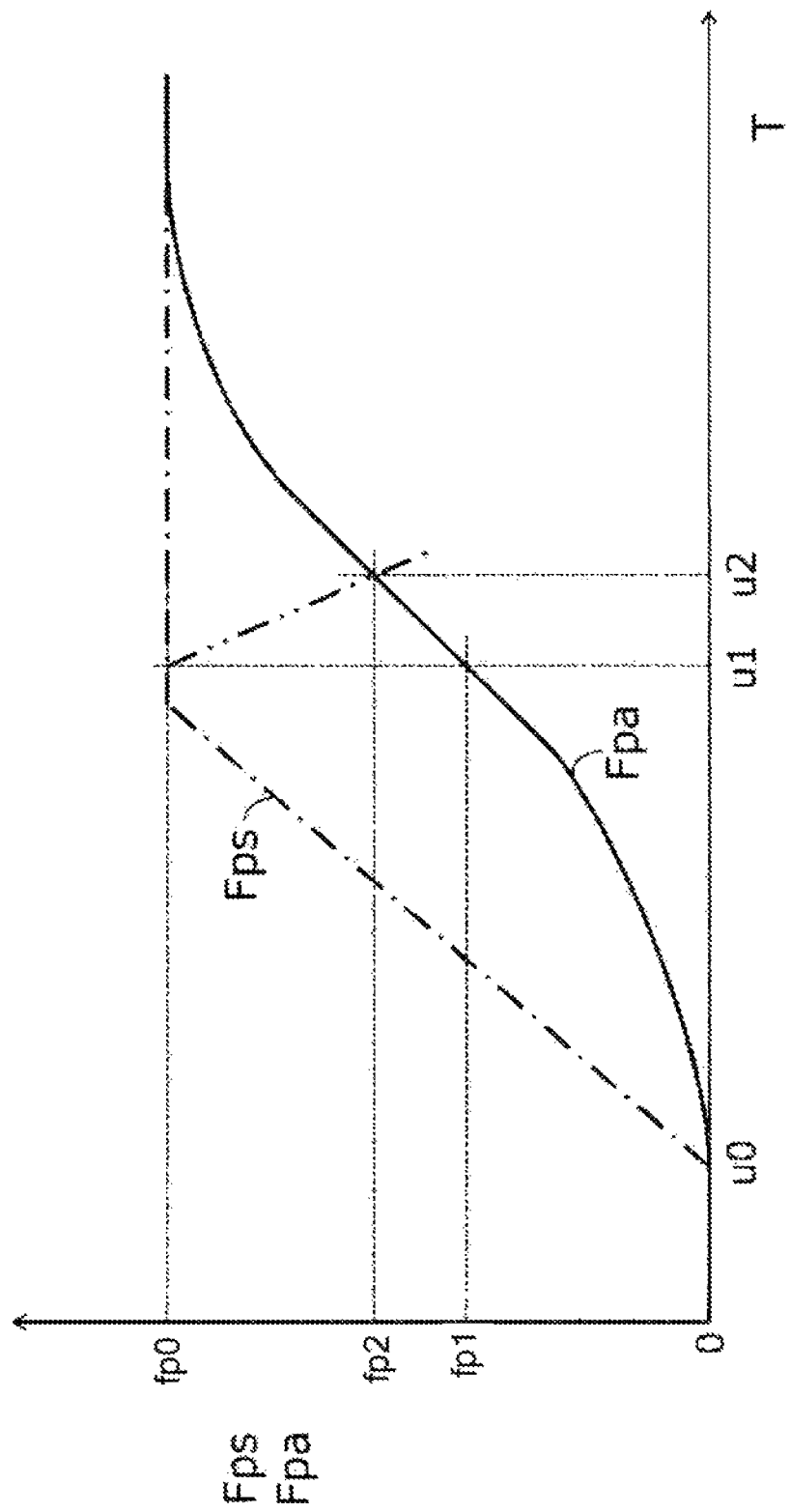
FIG. 9 is a time series diagram illustrating a problem caused by the time delay of an actual value Fpa with respect to a command value Fps of a pressing force.

The effects of the braking control device BCS for a vehicle according to the invention will be described with reference to a time series diagram of FIG. 8. A situation where a driver suddenly operates the braking operation member BP and wheel slip-suppression control (for example, antilock brake control) is started during the increase of the actual pressing force Fpa is supposed. Since a current is highly accurately controlled by current feedback control, the q-axis target current Iqt and the q-axis actual current Iqa overlap with each other and the d-axis target current Idt and the d-axis actual current Ida overlap with each other in FIG. 8.

The braking operation member BP starts to be operated suddenly at a time t0 by a driver, and the braking operation amount Bpa starts to be increased from "0". After a time t1, the braking operation amount Bpa is maintained at a value bp1. The command pressing force Fps is calculated as illustrated by one-dot chain line with an increase in the braking operation amount Bpa, so that the command pressing force Fps is determined as the target pressing force Fpt just as it is (that is, "Fpt=Fps"). That is, the target pressing force Fpt is increased up to a value fp1, which corresponds to a value bp1, from "0". However, since a time delay is present in the start of the electric motor MTR (the start of the rotation of the electric motor MTR in the normal direction), the actual pressing force Fpa is increased from "0" with a gradient more gentle than that of the target pressing force Fpt as illustrated by a solid line.

In a case where the electric motor MTR stops or is driven at a low speed, control for weakening magnetic fluxes is unnecessary. For this reason, immediately after the start of a braking operation (immediately after the time t1), d-axis currents Idt and Ida are 0 and only the q-axis currents Iqt and Iqa are generated. Then, as the rotational speed of the electric motor MTR is increased, the d-axis target current Idt is reduced toward a value −id2 from "0" (the absolute value of the d-axis target current Idt is increased). Since the d-axis target current Idt and the q-axis target current Iqt are in a trade-off relationship, the q-axis target current Iqt is reduced from the q-axis maximum current value iqm.

The wheel slip state quantity Slp is increased with an increase in the actual pressing force Fpa. Then, the start condition of antilock brake control is satisfied at a time t2 when the actual pressing force Fpa reaches a value fp2, so that antilock brake control is started. At the time t2 when antilock brake control starts to be executed, the target pressing force Fpt is reduced sharply to the value fp2 of the actual pressing force Fpa, which is obtained at the time t2, from the command pressing force Fps. That is, the command pressing force Fps is reduced on the basis of the actual pressing force Fpa (value fp2) obtained at the time of start of execution of slip-suppression control (time t2), so that the target pressing force Fpt is corrected and calculated. Specifically, the command pressing force Fps is corrected to be reduced sharply to "the value fp2 of the actual pressing force Fpa obtained at the time of start of execution of control", so that the final target pressing force Fpt is determined. Then, the target pressing force Fpt, which is obtained at the time t2, serves as a criterion, and a target pressing force Fpt after the time t2 is calculated.

Further, the target current vector Imt is determined on the basis of an interrelationship between the current limit circle Cis and the voltage limit circle Cvs so that the operation of the electric motor MTR in the normal direction is suddenly stopped at the time t2 and starts to be operated in the reverse direction. Specifically, the target current vector Imt (Idt, Iqt) is limited by the second intersection-d-axis coordinate Idx and the second intersection q-axis coordinate Iqx, so that the target current vector Imt (Idt, Iqt) is determined (see Step S750 of FIG. 5 and the target current vector Imt:4 of FIG. 6).

Since the sudden stop of the electric motor MTR is efficiently instructed at the time t2, the actual pressing force Fpa is slightly overshot to the value fp3 from the value fp2 but is then quickly reduced. The target pressing force Fpt matches the actual pressing force Fpa at a time t3. After the time t3, an increase and a reduction in the target pressing force Fpt are repeated so that the wheel slip state quantity Slp is in an appropriate range. That is, general antilock brake control is continued.

The command pressing force Fps is corrected on the basis of the actual pressing force (detected value) Fpa obtained at the time of start of execution of slip-suppression control, so that the final target pressing force Fpt is calculated. For this reason, there is no deviation eFp between the target pressing force Fpt and the actual pressing force Fpa at the time of start of execution of slip-suppression control. As a result, the hindrance of a reduction in the actual pressing force Fpa, which is caused by interference between pressing force-feedback control and wheel slip-suppression control, can be appropriately avoided. That is, excessive wheel slip, which is caused by a time delay in an increase of a pressing force at the time of start of execution of slip-suppression control, is suppressed.

In addition, the target current vector Imt (Idt, Iqt) is determined on the basis of an interrelationship between the current limit circle Cis and the voltage limit circle Cvs at the time of start of execution of slip-suppression control. Specifically, a second intersection Pxb (Idx, −Iqx) between the current limit circle Cis and the voltage limit circle Cvs is calculated, and the second intersection Pxb is calculated as a target current vector Imt (Idt, Iqt). Here, the second intersection Pxb (Idx, −Iqx) is an intersection, where the q-axis target current Iqt is instructed in the reverse direction (the −axis target current Iqt has a negative sign), of the two intersections Pxa and Pxb. A portion where the current limit circle Cis and the voltage limit circle Cvs overlap with each other is an area where a current can flow of the electric motor MTR, and the second intersection Pxb (Idx, −Iqx) is an operating point where the electric motor MTR is most efficiently driven in the reverse direction. For this reason, the electric motor MTR, which is being driven in the normal direction, is instantly stopped and is driven in the reverse direction. As a result, since excessive wheel slip is suppressed, wheel slip-suppression control can be executed so that the slip state quantity Slp is in an appropriate range.

Other Embodiments

Other embodiments will be described below. The same effects (the quick stop of the electric motor MTR being driven and the suppression of excessive wheel slip caused by the quick stop) as the above-mentioned effects are obtained even in other embodiments.

A case where the voltage limit circle Cvs is calculated using Equation (2) has been exemplified in the above-mentioned embodiment. A voltage drop, which is caused by the flowing of a current in the electric motor MTR, can be considered in the calculation of the voltage limit circle Cvs. The voltage drop is considered as "$(R \cdot Iqa)/(L \cdot \omega)$" in regard to the d-axis current, and is considered as "$(R \cdot Ida)/(L \cdot \omega)$" in regard to the q-axis current. Specifically, the voltage limit circle Cvs is calculated by Equation (5).

$$\{Idt+(\varphi/L)+(R \cdot Iqa)/(L \cdot \omega)\}^2+\{(R \cdot Ida)/(L \cdot \omega)-Iqt\}^2=\{Eba/(L \cdot \omega)\}^2 \quad \text{Equation (5)}$$

Here, "Eba" denotes a power supply voltage (that is, the voltage of the storage battery BAT or the generator ALT), "L" denotes a phase inductance, "$\varphi$" denotes the number of interlinkage magnetic fluxes (the strength of a magnet), and "R" denotes wiring/winding wire resistance. Further, "$\omega$" denotes the electrical angular velocity of the electric motor MTR, and is calculated on the basis of the rotation angle Mka. Furthermore, "Ida" denotes a d-axis actual current and "Iqa" denotes a q-axis actual current, and the d-axis actual current and the q-axis actual current are calculated on the basis of values Ima detected by the current sensors IMA (see FIG. 7).

A voltage drop is considered in Equation (3) on the basis of the d-axis component Ida and the q-axis component Iqa. A d-axis target current Idt[n−1] and a q-axis target current Iqt[n−1] of the previous calculation period are employed instead of the d-axis component Ida and the q-axis component Iqa. That is, a voltage drop is considered on the basis of the d-axis target current Idt[n−1] and the q-axis target current Iqt[n−1] of the previous calculation period, so that a d-axis target current Idt[n] and a q-axis target current Iqt[n] of the present calculation period can be calculated. Here, letter [n] attached to the tail of the reference letter means the present calculation period, and letter [n−1] means the previous calculation period. Specifically, the voltage limit circle Cvs is calculated by Equation (6).

$$\{Idt[n]+(\varphi/L)+(R \cdot Iqt[n-1])/(L \cdot \omega)\}^2+\{(R \cdot Idt[n-1])/(L \cdot \omega)-Iqt[n]\}^2=\{Eba/(L \cdot \omega)\}^2 \quad \text{Equation (6)}$$

A voltage drop is considered as shown in Equation (5) or Equation (6), so that the highly accurate driving of the electric motor MTR can be achieved.

In the above-mentioned embodiment, in the calculation of the electrical angular velocity $\omega$ of the electric motor MTR, the electrical angle $\theta$ is calculated on the basis of the rotation angle Mka (mechanical angle) of the electric motor MTR and the electrical angle $\theta$ is differentiated with respect to time, so that the electrical angular velocity $\omega$ is calculated. That is, the electrical angular velocity $\omega$ is determined in the order of "Mka→$\theta$→$\omega$". Instead of this, the rotational speed dMk may be calculated on the basis of the rotation angle Mka and the electrical angular velocity $\omega$ may be calculated on the basis of the rotational speed dMk. That is, the electrical angular velocity $\omega$ can be determined in the order of "Mka→dMk→$\omega$". However, in both cases, the voltage limit circle Cvs of the dq-axis current characteristics is calculated on the basis of the rotation angle Mka detected by the rotation angle sensor MKA.

The configuration of a disc type braking device (disc brake) has been exemplified in the above-mentioned embodiment. In this case, the friction member MS is a brake pad and the rotation member KT is a brake disc. A drum type braking device (drum brake) can be employed instead of the disc type braking device. In the case of the drum brake, a brake drum is employed instead of the caliper CP. Further, the friction member MS is a brake shoe and the rotation member KT is a brake drum.

A case where a braking force is applied to one wheel WH by the pressurizing unit KAU has been exemplified in the above-mentioned embodiment. However, braking forces of a plurality of wheels WH can be generated by the pressurizing unit KAU. In this case, a plurality of wheel cylinders WC are connected to the fluid passage HWC.

In addition, a cylinder, which includes two fluid pressure chambers partitioned by two pressurizing pistons, can be employed as the pressurizing cylinder KCL. That is, a tandem type structure is employed in the pressurizing cylinder KCL. Further, two wheel cylinders WC for two wheels among four wheels WH are connected to one fluid pressure chamber, and the rest two wheel cylinders WC for the rest two wheels among four wheels WH are connected to the other fluid pressure chamber. Accordingly, a so-called front-rear type or diagonal type fluid structure, which uses the pressurizing cylinder KCL as a fluid pressure source, can be formed.

The configuration of a fluid pressure type braking control device in which the rotational power of the electric motor MTR is converted into the fluid pressure of the wheel cylinder WC through braking fluid and a braking force is generated on the wheel WH has been exemplified in the above-mentioned embodiment. An electromechanical braking control device, which does not use braking fluid, can be employed instead of this. In this case, KAU is mounted on the caliper CP. Further, a thrust sensor is employed as the pressing force sensor FPA instead of a fluid pressure sensor. For example, the thrust sensor can be provided between the power transmission mechanism DDK and the pressurizing piston PKC as illustrated by "(FPA)" of FIG. 1.

Furthermore, a composite structure in which a fluid pressure type pressurizing unit using braking fluid can be employed for a front wheel and an electromechanical pressurizing unit is employed for a rear wheel can be formed.

The invention claimed is:

1. A braking control device for a vehicle that drives an electric motor on the basis of a command pressing force corresponding to a braking force required for a wheel of a vehicle and presses a friction member against a rotation member fixed to the wheel to generate a braking force on the wheel, the braking control device comprising:
   a wheel speed sensor that detects a speed of the wheel;
   a pressing force sensor that detects an actual pressing force applied to the rotation member by the friction member; and
   a controller that calculates a target pressing force on the basis of the command pressing force and controls the electric motor so that the target pressing force and the actual pressing force match each other, wherein the controller
      calculates a slip state quantity representing the degree of slippage of the wheel on the basis of the speed of the wheel and executes slip-suppression control, which reduces the degree of slippage of the wheel, on the basis of the slip state quantity, and
      reduces the command pressing force and calculates the target pressing force on the basis of the actual pressing force at the start of execution of the slip-suppression control, wherein the controller sharply reduces the command pressing force to a value of the actual pressing force, which is obtained at the time of start of execution of the slip-suppression control, to calculate the target pressing force at the time of start of execution of the slip-suppression control.

* * * * *